(12) United States Patent
Foody et al.

(10) Patent No.: US 12,398,844 B2
(45) Date of Patent: Aug. 26, 2025

(54) METHOD AND SYSTEM FOR PROCESSING BIOGAS

(71) Applicant: Iogen Corporation, Ottawa (CA)

(72) Inventors: Brian Foody, Ottawa (CA); Patrick J. Foody, Ottawa (CA); Jeffrey S. Tolan, Ottawa (CA)

(73) Assignee: Iogen Corporation, Ottawa (CA)

( * ) Notice: Subject to any disclaimer, the term of this patent is extended or adjusted under 35 U.S.C. 154(b) by 1174 days.

(21) Appl. No.: 17/271,014

(22) PCT Filed: Aug. 23, 2019

(86) PCT No.: PCT/CA2019/000122
§ 371 (c)(1),
(2) Date: Feb. 24, 2021

(87) PCT Pub. No.: WO2020/041857
PCT Pub. Date: Mar. 5, 2020

(65) Prior Publication Data
US 2021/0324282 A1 Oct. 21, 2021

Related U.S. Application Data

(60) Provisional application No. 62/724,485, filed on Aug. 29, 2018.

(51) Int. Cl.
*F17C 7/00* (2006.01)
*F17C 5/00* (2006.01)

(52) U.S. Cl.
CPC ............. *F17C 7/00* (2013.01); *F17C 5/00* (2013.01); *C10L 2200/0469* (2013.01);
(Continued)

(58) Field of Classification Search
CPC ... B01D 2258/05; C10L 3/08; C10L 2290/26; C10L 3/10; C10L 2200/0469; F17C 2221/033; F17C 7/00
See application file for complete search history.

(56) References Cited

U.S. PATENT DOCUMENTS 4,380,242 A 4/1983 Bresie et al.
4,677,827 A 7/1987 Shenoy et al.
(Continued)

FOREIGN PATENT DOCUMENTS

CA 2842759 2/2013
CA 2820733 7/2017
(Continued)

OTHER PUBLICATIONS

Beilstein, Natasha; and Zhu, Lei, "Ethanol producers need to reduce their CI score—and quickly", 2019, Ethanol Producer Magazine.
(Continued)

*Primary Examiner* — Imran Akram
(74) *Attorney, Agent, or Firm* — Knobbe Martens Olson & Bear, LLP

(57) ABSTRACT

A method of processing biogas that includes obtaining a mobile tank containing biogas at a pressure greater than 1000 psig, connecting the mobile tank to a pressure let down system, and depressurizing the mobile tank to remove biogas therein. The depressurization includes removing gas from the mobile tank using the pressure let down system, and introducing a warming gas into the mobile tank.

21 Claims, 6 Drawing Sheets

(52) U.S. Cl.
CPC .............. *F17C 2221/033* (2013.01); *F17C 2223/0123* (2013.01); *F17C 2223/036* (2013.01); *F17C 2225/0123* (2013.01); *F17C 2250/043* (2013.01); *F17C 2250/0439* (2013.01); *F17C 2260/032* (2013.01)

(56) References Cited

U.S. PATENT DOCUMENTS

| | | |
|---|---|---|
| 5,570,729 A | 11/1996 | Mutter |
| 5,603,360 A | 2/1997 | Teel |
| 6,112,528 A | 9/2000 | Rigby |
| 6,932,121 B1* | 8/2005 | Shivers, III ............ F17C 3/025 405/59 |
| 7,691,182 B1 | 4/2010 | Muradov et al. |
| 7,731,779 B2 | 6/2010 | Palumbo |
| 8,007,567 B2 | 8/2011 | Roe et al. |
| 8,373,305 B2 | 2/2013 | Adam et al. |
| 8,404,025 B2 | 3/2013 | Frisbie et al. |
| 8,549,877 B2 | 10/2013 | Santos |
| 8,658,026 B2 | 2/2014 | Foody et al. |
| 8,753,854 B2 | 6/2014 | Foody |
| 8,833,088 B2 | 9/2014 | Bayliff et al. |
| 8,945,373 B2 | 2/2015 | Foody |
| 8,999,036 B2 | 4/2015 | Pierce |
| 9,040,271 B2 | 5/2015 | Foody |
| 9,108,894 B1 | 8/2015 | Foody et al. |
| 9,145,300 B1 | 9/2015 | Foody |
| 9,222,048 B1 | 12/2015 | Foody |
| 9,234,627 B2 | 1/2016 | Cajiga et al. |
| 9,243,190 B2 | 1/2016 | Patience et al. |
| 9,506,605 B2 | 11/2016 | Paget et al. |
| 9,514,464 B2 | 12/2016 | Foody |
| 9,535,045 B2 | 1/2017 | Gerhold |
| 9,605,286 B2 | 3/2017 | Foody |
| 9,625,097 B2 | 4/2017 | Bayliff et al. |
| 9,625,099 B2 | 4/2017 | Ding |
| 9,644,792 B2 | 5/2017 | Moszkowski et al. |
| 9,863,581 B2 | 1/2018 | Santos et al. |
| 9,969,949 B1 | 5/2018 | Foody et al. |
| 10,093,540 B2 | 10/2018 | Foody |
| 10,132,447 B2 | 11/2018 | Whiteman et al. |
| 10,183,267 B2 | 1/2019 | Day et al. |
| 10,202,622 B2 | 2/2019 | Foody et al. |
| 10,421,663 B2 | 9/2019 | Foody |
| 10,487,282 B2 | 11/2019 | Foody et al. |
| 10,619,173 B2 | 4/2020 | Foody et al. |
| 10,640,793 B2 | 5/2020 | Foody et al. |
| 10,723,621 B2 | 7/2020 | Foody |
| 10,760,024 B2 | 9/2020 | Foody et al. |
| 10,894,968 B2 | 1/2021 | Foody et al. |
| 10,968,151 B1 | 4/2021 | Whitmore |
| 10,981,784 B2 | 4/2021 | Foody |
| 11,220,470 B2 | 1/2022 | Whitmore |
| 11,299,686 B2 | 4/2022 | Foody et al. |
| 11,434,509 B2 | 9/2022 | Foody et al. |
| 11,708,313 B2 | 7/2023 | Whitmore |
| 11,746,301 B2 | 9/2023 | Foody et al. |
| 11,760,630 B2 | 9/2023 | Foody |
| 11,827,916 B2 | 11/2023 | Foody et al. |
| 11,946,001 B2 | 4/2024 | Foody |
| 11,946,006 B2 | 4/2024 | Foody et al. |
| 2003/0225169 A1 | 12/2003 | Yetman |
| 2006/0213370 A1* | 9/2006 | Leonard ............ B01D 53/18 96/243 |
| 2007/0157804 A1* | 7/2007 | McManus ............ F17C 11/00 95/114 |
| 2008/0134754 A1 | 6/2008 | Funk |
| 2008/0209916 A1* | 9/2008 | White ............ F17C 5/06 62/48.1 |
| 2010/0000153 A1 | 1/2010 | Kurkjian et al. |
| 2010/0108567 A1 | 5/2010 | Medoff |
| 2011/0084020 A1* | 4/2011 | Ott ............ C02F 3/2893 210/603 |
| 2012/0308989 A1* | 12/2012 | Barclay ............ C12M 43/08 435/167 |
| 2013/0161235 A1 | 6/2013 | Foody |
| 2013/0164807 A1* | 6/2013 | Foody ............ C10G 65/12 435/166 |
| 2013/0183705 A1 | 7/2013 | Barclay et al. |
| 2013/0224808 A1 | 8/2013 | Bell et al. |
| 2013/0225885 A1* | 8/2013 | Foody ............ C10G 65/04 585/254 |
| 2014/0227751 A1 | 8/2014 | Datta et al. |
| 2014/0349360 A1 | 11/2014 | Zhang et al. |
| 2014/0370559 A1 | 12/2014 | Oakley et al. |
| 2015/0101671 A1 | 4/2015 | Paget et al. |
| 2015/0211684 A1* | 7/2015 | Santos ............ F17C 11/007 137/1 |
| 2015/0345708 A1 | 12/2015 | Sloan et al. |
| 2016/0178128 A1* | 6/2016 | Le Bruchec ............ F17C 9/02 62/53.2 |
| 2016/0245459 A1 | 8/2016 | Grimmer et al. |
| 2016/0247183 A1 | 8/2016 | Foody |
| 2016/0281927 A1 | 9/2016 | Bjorn et al. |
| 2016/0290563 A1 | 10/2016 | Diggins |
| 2017/0074583 A1 | 3/2017 | Tremblay et al. |
| 2017/0130901 A1 | 5/2017 | Sloan et al. |
| 2017/0241592 A1 | 8/2017 | Whiteman et al. |
| 2017/0304769 A1 | 10/2017 | Bigeard et al. |
| 2018/0079672 A1 | 3/2018 | Meyer et al. |
| 2018/0094772 A1* | 4/2018 | Santos ............ F17C 11/007 |
| 2018/0112142 A1* | 4/2018 | Foody ............ C10L 3/105 |
| 2018/0138528 A1* | 5/2018 | Komiya ............ H01M 8/04201 |
| 2018/0155649 A1 | 6/2018 | Gerhold et al. |
| 2018/0251372 A1 | 9/2018 | Foody |
| 2019/0001263 A1 | 1/2019 | Prince |
| 2019/0030482 A1 | 1/2019 | Ding et al. |
| 2019/0144890 A1 | 5/2019 | Subbian et al. |
| 2019/0144895 A1 | 5/2019 | Foody et al. |
| 2019/0185884 A1 | 6/2019 | Foody et al. |
| 2019/0224617 A1 | 7/2019 | Mitariten |
| 2019/0262770 A1 | 8/2019 | Thygesen |
| 2020/0140901 A1 | 5/2020 | Foody et al. |
| 2020/0148964 A1 | 5/2020 | Foody et al. |
| 2020/0318896 A1 | 10/2020 | Prince et al. |
| 2021/0055046 A1 | 2/2021 | Prince |
| 2021/0060486 A1 | 3/2021 | Prince |
| 2021/0094894 A1 | 4/2021 | Whitmore |
| 2021/0155864 A1 | 5/2021 | Foody et al. |
| 2021/0172677 A1 | 6/2021 | Terrien et al. |
| 2021/0275961 A1 | 9/2021 | Foody et al. |
| 2021/0317377 A1 | 10/2021 | Foody et al. |
| 2022/0177792 A1 | 6/2022 | Foody et al. |
| 2022/0267688 A1 | 8/2022 | Foody et al. |
| 2023/0053930 A1 | 2/2023 | Foody et al. |
| 2023/0295523 A1 | 9/2023 | Foody |
| 2024/0025739 A1 | 1/2024 | Foody |
| 2024/0123399 A1 | 4/2024 | Buckenham |
| 2024/0209272 A1 | 6/2024 | Foody et al. |

FOREIGN PATENT DOCUMENTS

| | | |
|---|---|---|
| DE | 102013011289 | 1/2015 |
| EP | 0207277 | 1/1990 |
| EP | 3085766 | 10/2016 |
| EP | 4 043 089 | 8/2022 |
| WO | WO 2010006910 | 1/2010 |
| WO | WO 2011/101137 A1 | 8/2011 |
| WO | WO 2013/021140 | 2/2013 |
| WO | WO 2017195103 | 11/2017 |
| WO | WO 2018144328 | 8/2018 |
| WO | WO 2019185315 | 10/2019 |
| WO | WO 2020010430 | 1/2020 |
| WO | WO 2020010431 | 1/2020 |
| WO | WO 2020041857 | 3/2020 |
| WO | WO2021003564 | 1/2021 |

(56) References Cited

FOREIGN PATENT DOCUMENTS

| WO | WO2021142528 | 7/2021 |
|---|---|---|
| WO | WO 2022/147610 | 7/2022 |

OTHER PUBLICATIONS

Biswas, S; Katiyar, R.; Gurjar, B.R.; and Pruthi, V., "Biofuels and Their Production Through Different Catalytic Routes", Chem. Biochem. Eng. Q., 31 (2017), 47-62.

European Biogas Association; "Good Practices and Innovations in the Biogas Industry", 2018, downloaded from http://european-biogas.eu/wp-content/uploads/2018/02/Success-Stories-EBA-2018.pdf on Aug. 28, 2019.

Hakawati, Rawan; Smyth, Beatrice M; McCullough, Geoffrey; De Rosa, Fabio; and Rooney, David, "What is the most energy efficient route for biogas utilization: Heat, electricity or transport?", Applied Energy, 206 (2017), 1076-1087.

Heijstra, Bjorn D., Leang, Ching; and Juminaga, Alex, "Gas Fermentation: Cellular Engineering Possibilities and Scale Up", Microb Cell Fact, 16 (2017).

Hengeveld, E.J.; Bekkering, J.; van Gemert, W.J.T.; and Broekhuis, A.A.; "Biogas infrastructures from farm to regional scale, prospects of biogas transport grids", Biomass and Bioenergy, 86 (2016) 43-52.

Hjort, Anders; and Tamm, Daniel; "Transport Alternatives for Biogas", BioMil AB., Nov. 8, 2012.

Hovland, Jon; "Compression of raw biogas—A feasibility study", Report No. 2217020-1 (2017).

IPCC Fourth Assessment Report: Climate Change 2007, 5.3.1.3 Alternative fuels—AR4 WGIII Chapter 5: Transport and its infrastructure.

Kapoor, Rimika Madan; and Vijay, Virendra K.; "Seventh Framework Programme Theme Energy", downloaded on Aug. 27, 2019. Available at http://www.valorgas.soton.ac.uk/Deliverables/120825_VALORGAS_241334_D5-2_rev[0].pdf.

Krich, Ken.; Augenstein, Don; Batmale, JP; Benemann, John, Rutledge; Brad, and Salour, Dara; "Biomethane from Dairy Waste A Sourcebook for the Production and Use of Renewable Natural Gas in California", Chapter 4, downloaded from http://www.suscon.org/pdfs/cowpower/biomethaneSourcebook/Chapter_4.pdf, on Aug. 23, 2019.

Munoth, Kailash Kumar Jain; "Models for Decanting Gaseous Fuel Tanks: Simulations with GFSSP Thermal Model", (2016), Mechanical (and Materials) Engineering—Dissertations, University of Nebraska-Lincoln.

Privat, Romain and Jaubert, Jean Noel; "Predicting the Phase Equilibria of Carbon Dioxide Containing Mixtures Involved in CCS Processes Using the PPR78 Model," Chapter 15.

Rufford, T.E.; Smart, S.; Watson, G.C.Y.; Graham, B.F.; Boxall, J.; Diniz da Costa, J.C.; and May, E.F., "The Removal of CO2 and N2 from Natural Gas: A review of conventional and Emerging Process Technologies", Journal of Petroleum Science and Engineering 94 (2012) 123-154.

Schill, Suzanne Retka, "California Carbon Check", 2019, Ethanol Producer Magazine.

Stafford, William.; Lotter, Adrian; Brent, Alan; and von Maltiitz, "Biofuels Technology", United Nations University, 2017.

Torresani, Mark J., and Bloomenkranz, Bill; "Renewable Natural Gas Delivery Options. Getting your RNG to market" (2018), Tetra Tech, Swanapalooza, Denver Colorado.

Unnasch, Stefan, "GHG Emissions Reductions due to the RFS2: A 2018 Update", Life Cycle Associates.

Vitu, Stephane; Privat, Romain; Jaubert, Jean-Noel; and Mutelet, Fabrice; "Predicting the phase equilibria of CO2 + hydrocarbon systems with the PPR78 model (PR EOS and kij calculated through a group contribution method)", J. of Supercritical Fluids, 45 (2008), 1-26.

Wang, Zhichao, "Positioning your plant to maximize the opportunity created by low carbon fuel markets", 2018, ACE EcoEngineers.

International Search Report issued in PCT Application No. PCT/CA2019/000104 dated Oct. 18, 2019.

International Search Report issued in PCT Application No. PCT/CA2019/000103 dated Sep. 16, 2019.

International Search Report issued in PCT Application No. PCT/CA2019/000122 dated Nov. 8, 2019.

Hovland, J., "Kompresjon av ra biogass", Tel-Tek, dated Jun. 1, 2017, in 24 pages.

International Preliminary Report on Patentability issued Jul. 4, 2023 for PCT Application No. PCT/CA2021/051845.

Invitation to Pay Additional Fees mailed Sep. 2, 2020 for PCT Application No. PCT/CA2020/050936, filed Jul. 6, 2020.

International Search Report and Written Opinion mailed Oct. 22, 2020 for PCT Application No. PCT/CA2020/050936, filed Jul. 6, 2020.

International Preliminary Report on Patentability issued Jan. 20, 2022 for PCT Application No. PCT/CA2020/050936, filed Jul. 6, 2020.

Office Action for U.S. Appl. No. 17/258,607, dated Jan. 5, 2024.

Restriction Requirement for U.S. Appl. No. 17/258,711 dated Dec. 29, 2023.

Irena (2018), Biogas for road vehicles: Technology brief, International Renewable Energy Agency, Abu Dhabi.

Hovland et al.; "Compression and transport of raw biogas", Sintef Tel-tek (2019).

Hengeveld et al., "When does decentralized production of biogas and centralized upgrading and injection into the natural gas grid make sense?", Biomass and Bioenergy, Jun. 2014, vol. 67, pp. 363-371.

Li et al., "Capturing CO2 from biogas plants", Energy Procedia, Jul. 2017, vol. 114, pp. 6030-6035.

Scholwin et al., "Biogas for Road Vehicles: Technology Brief", IRENA Mar. 2017 (Mar. 2017), in 62 pages.

Chinese Office Action in CN Application No. 201980045125.7 dated May 27, 2022.

European Office Action in EP Application No. 19833590.3 dated Mar. 3, 2022.

European Office Action in EP Application No. 19833450.0 dated May 3, 2022.

European Office Action in EP Application No. 19853629.4 dated May 20, 2022.

International Search Report and Written Opinion mailed Oct. 18, 2019 for PCT Application No. PCT/CA2019/000104, filed Jul. 9, 2019.

International Preliminary Report on Patentability issued Jan. 21, 2021 for PCT Application No. PCT/CA2019/000104, filed Jul. 9, 2019.

International Search Report and Written Opinion mailed Sep. 16, 2019 for PCT Application No. PCT/CA2019/000103, filed Jul. 9, 2019.

International Preliminary Report on Patentability issued Jan. 21, 2021 for PCT Application No. PCT/CA2019/000103, filed Jul. 9, 2019.

International Search Report and Written Opinion mailed Mar. 17, 2022 for PCT Application No. PCT/CA2021/051845, filed Mar. 17, 2022.

International Search Report and Written Opinion mailed Nov. 8, 2019 for PCT Application No. PCT/CA2019/000122, filed Aug. 23, 2019.

International Preliminary Report on Patentability issued Mar. 11, 2021 for PCT Application No. PCT/CA2019/000122, filed Aug. 23, 2019.

Office Action for U.S. Appl. No. 17/258,607, dated Nov. 26, 2021.
Office Action for U.S. Appl. No. 17/258,607, dated May 12, 2022.
Chinese Office Action in CN Application No. 201980045125.7 dated Jan. 28, 2023.
Chinese Office Action in CN Application No. 201980045125.7 dated Apr. 28, 2023.
Office Action for U.S. Appl. No. 17/258,607, dated Mar. 17, 2022.
Office Action for U.S. Appl. No. 17/258,607, dated Apr. 13, 2023.
Office Action for U.S. Appl. No. 17/652,868, dated Mar. 6, 2023.
Notice of Allowance for U.S. Appl. No. 17/652,868, dated Apr. 19, 2023.

(56) References Cited

OTHER PUBLICATIONS

Advisory Action for U.S. Appl. No. 17/258,607, dated Jul. 22, 2022.
Advisory Action for U.S. Appl. No. 17/258,607, dated Sep. 1, 2022.
Office Action for U.S. Appl. No. 17/258,607, dated Oct. 27, 2022.
Office Action for U.S. Appl. No. 17/652,868, dated Oct. 6, 2022.
Canadian Office Action in CA Application No. 3,102,390 dated Mar. 1, 2024.
Canadian Office Action in CA Application No. 3,102,417 dated Feb. 2, 2024.
Canadian Office Action in CA Application No. 3,112,339 dated Mar. 20, 2024.
Canadian Office Action in CA Application No. 3,145,848 dated Mar. 1, 2024.
European Office Action in EP Application No. 20836871.2 dated Apr. 2, 2024.
Office Action for U.S. Appl. No. 17/258,607, dated Jun. 6, 2024.
Office Action for U.S. Appl. No. 17/258,711, dated Jun. 6, 2024.
Restriction Requirement for U.S. Appl. No. 17/142,537, dated Jun. 12, 2024.

\* cited by examiner

METHOD AND SYSTEM FOR PROCESSING BIOGAS

INCORPORATION BY REFERENCE TO ANY PRIORITY APPLICATIONS

Not Applicable.

TECHNICAL FIELD

The present disclosure relates generally to a method and/or system for processing biogas, and in particular to a method and/or system for processing biogas that includes removing biogas from a pressurized tank.

BACKGROUND

Biogas is a renewable source of methane ($CH_4$), the main component in natural gas. More specifically, it is mixture of several gases, which typically is predominantly $CH_4$ and carbon dioxide ($CO_2$), but also may include water ($H_2O$), nitrogen ($N_2$), hydrogen sulfide ($H_2S$), oxygen ($O_2$), volatile organic compounds (VOCs), siloxanes, hydrogen ($H_2$), ammonia ($NH_3$), and/or carbon monoxide (CO).

In general, biogas is produced by the breakdown of organic matter in low oxygen conditions. For example, biogas may be produced in landfills (LFs) or in anaerobic digesters used to treat organic matter (e.g., food waste or agricultural organics from farming operations such as manure, crop residues, and/or energy crops). The composition of biogas at its source (e.g., raw biogas) may vary with the type of organic matter from which it is derived. For example, landfill gas may contain 45-55% $CH_4$, 30-40% $CO_2$, and 5-15% nitrogen ($N_2$), whereas biogas from organic waste digesters may contain 60-70% $CH_4$, 30-40% $CO_2$, and <1% $N_2$.

Biogas may be used without purification (e.g., raw biogas) or may be upgraded in a process that removes $CO_2$ and/or $N_2$, and typically some other contaminants, to increase the relative amount of $CH_4$, and thus the calorific value. When raw biogas is upgraded to the extent that it is substantially interchangeable with natural gas (e.g., meets applicable specifications of a natural gas distribution system) it may be referred to as "renewable natural gas" or "RNG."

Biogas may be collected and used in place of natural gas in many applications, including the production of electricity, steam, or transportation fuels. For example, biogas upgraded to RNG can be used directly as a transportation fuel. Alternatively, biogas can be used as a feedstock for chemical or fuel production. For example, biogas may be used as a feedstock to produce hydrogen, methanol, ethanol, gasoline, diesel, or dimethyl ether (DME).

While there are important environmental benefits to using biogas instead of fossil natural gas, one barrier to implementing its use in the production of chemicals or fuels is that biogas is often produced on a small scale (e.g., relative to fossil natural gas production). Biogas upgrading, chemical production, and fuel production processes (e.g., gas-to-liquid fuel processes), typically benefit from economies of scale (i.e., the cost of producing larger volumes is lower than the cost of processing smaller volumes, per unit volume). Accordingly, it may be advantageous to collect biogas from one or more sources and transport it to a central processing facility.

Both raw biogas and upgraded biogas may be transported via pipeline and/or in mobile tanks (e.g., truck transport). For example, RNG may be transported via a natural gas distribution system or may be transported using commercially available compressed natural gas (CNG) trucks. However, since small scale biogas upgrading may not be economical, biogas produced at small biogas plants may need to be transported to a central processing facility as raw or partially purified biogas (e.g., see PCT/CA2019/000104). Raw or partially purified biogas may be transported via a dedicated biogas pipeline, however, in some cases, economics or other reasons may make this undesirable (e.g., the biogas plant may be located too far from the central processing facility for pipeline transport to be economically feasible).

SUMMARY

The present disclosure describes a method and/or system that may facilitate transporting raw or partially purified biogas in mobile tanks (e.g., by truck, rail, or ship to a central processing facility). More specifically, the present disclosure describes a method and/or system of removing (decanting) a $CO_2/CH_4$ mixture (e.g., raw biogas or partially purified biogas) from a tank held at a relatively high pressure (e.g., above 1000 psig).

In accordance with one aspect of the instant invention there is provided a method of processing biogas comprising: providing a mobile tank containing biogas at an initial pressure, said initial pressure greater than 1000 psig; connecting the mobile tank containing biogas to a pressure let down system; and depressurizing the mobile tank from the initial pressure to a final pressure, said depressurizing comprising: a) removing gas from the mobile tank using the pressure let down system; b) introducing a warming gas into the mobile tank.

In accordance with one aspect of the instant invention there is provided a method of processing biogas comprising: providing a mobile tank containing biogas at an initial pressure, said initial pressure greater than 1000 psig; connecting the mobile tank containing biogas to a pressure let down system; feeding biogas in the mobile tank to the pressure let down system; reducing the pressure in the mobile tank from the initial pressure to a final pressure using the pressure let down system; maintaining a temperature within the mobile tank within a predetermined range as the pressure is reduced to the final pressure by introducing a warming gas into the mobile tank; and, feeding a gas stream comprising the biogas removed from the mobile tank to a biogas upgrading system, a fuel production system, or a combination thereof.

In accordance with one aspect of the instant invention there is provided a method of processing biogas comprising: a) receiving a mobile tank containing a first gas, said first gas comprising biogas having a carbon dioxide content of at least 10% and a methane content of at least 40%, said mobile tank at a first pressure, said first pressure greater than 1000 psig; b) decanting the first gas from the mobile tank, said decanting reducing the pressure in the mobile tank to a second pressure, said second pressure less than 500 psig; and c) transporting the decanted mobile tank, wherein decanting the first gas from the mobile tank comprises: connecting the mobile tank to a pressure let down system; reducing the pressure in the mobile tank using the pressure let down system; and introducing a second gas into the mobile tank, said second gas comprising biogas having a carbon dioxide content of at least 10% and a methane content of at least 40%, wherein said introducing comprises mixing said first and second gases and wherein said second gas is warmer than said first gas prior to mixing.

In accordance with one aspect of the instant invention there is provided a method of producing a fuel from biogas comprising: filling a mobile tank with biogas to a first pressure, said biogas comprising raw biogas or partially purified biogas from a first source; transporting the mobile tank containing the biogas; unloading the transported biogas from the mobile tank; and producing upgraded biogas, a fuel, or a combination thereof from the unloaded biogas, wherein unloading the biogas from the mobile tank comprises removing a mixture comprising the biogas from the first source and biogas from a second other source, where the biogas from the second other source is raw biogas or partially purified biogas introduced into the mobile tank during said unloading.

DETAILED DESCRIPTION

Figure 1:
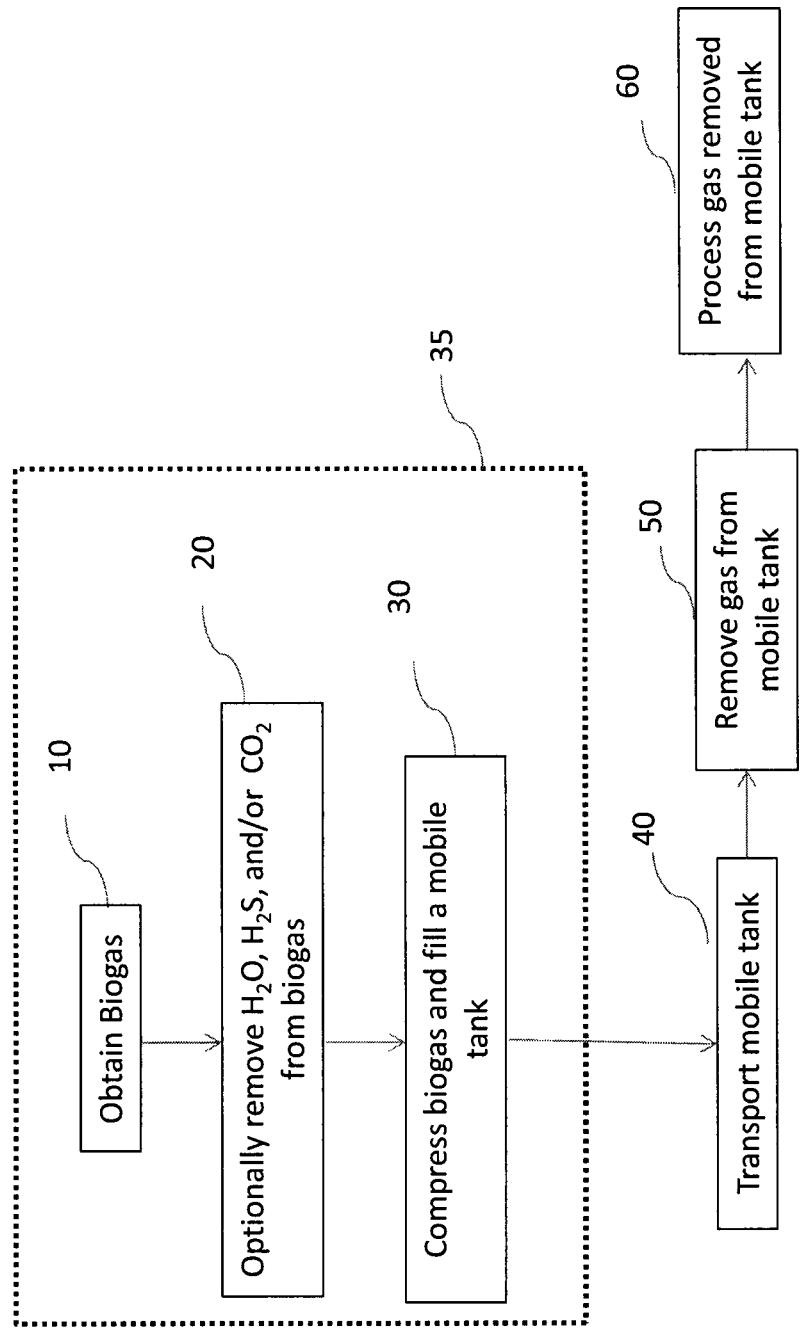
FIG. 1 is a flow diagram of a method according to one embodiment of the invention.

Certain exemplary embodiments of the invention now will be described in more detail, with reference to the drawings, in which like features are identified by like reference numerals. The invention may, however, be embodied in many different forms and should not be construed as limited to the embodiments set forth herein. The terminology used herein is for the purpose of describing certain embodiments only and is not intended to be limiting of the invention. For example, as used herein, the singular forms "a," "an," and "the" may include plural references unless the context clearly dictates otherwise. The terms "comprises", "comprising", "including", and/or "includes", as used herein, are intended to mean "including but not limited to." The term "and/or", as used herein, is intended to refer to either or both of the elements so conjoined. The phrase "at least one" in reference to a list of one or more elements, is intended to refer to at least one element selected from any one or more of the elements in the list of elements, but not necessarily including at least one of each and every element specifically listed within the list of elements. Thus, as a non-limiting example, the phrase "at least one of A and B" may refer to at least one A with no B present, at least one B with no A present, or at least one A and at least one B in combination. In the context of describing the combining of components by the "addition" or "adding" of one component to another, or the separating of components by the "removal" or "removing" of one component from another, those skilled in the art will understand that the order of addition/removal is not critical (unless stated otherwise). The terms "remove", "removing", and "removal", with reference to one or more impurities, contaminants, and/or constituents of biogas, includes partial removal. The terms "cause" or "causing", as used herein, may include arranging or bringing about a specific result (e.g., a withdrawal of a gas), either directly or indirectly, or to play a role in a series of activities through commercial arrangements such as a written agreement, verbal agreement, or contract. The term "associated with", as used herein with reference to two elements (e.g., a fuel credit associated with the transportation fuel), is intended to refer to the two elements being connected with each other, linked to each other, related in some way, dependent upon each other in some way, and/or in some relationship with each other. The terms "first", "second", etc., may be used to distinguish one element from another, and these elements should not be limited by these terms. The term "plurality", as used herein, refers to two or more. Unless defined otherwise, all technical and scientific terms used herein have the same meanings as commonly understood by one of ordinary skill in the art.

The instant disclosure relates to method and/or system that may facilitate the bulk transport of biogas (e.g., from one or more biogas plants to a central processing facility), in mobile tanks. In accordance with one embodiment, the invention includes a method and/or system for removing (decanting) the biogas from the mobile tanks.

In theory, it may be possible to compress raw biogas to pressures as high as 4350 psig (300 bar). However, the depressurization of such mixtures is more complex. As the mixture is removed from the tank, it will expand and undergo a temperature reduction (i.e., according to the Joule-Thomson effect). This cooling effect, which is commonly observed when decanting natural gas from CNG trucks, is why CNG pressure-let down stations (e.g., decanting stations or decompression stations) are often equipped with temperature control (e.g., heater(s) or heat exchangers that preheat the high pressure gas prior to pressure reduction, or after the pressure reduction). However, unlike natural gas, which may have a negligible or very small (e.g., under 2%) $CO_2$ content, a $CO_2/CH_4$ mixture such as biogas or partially purified biogas, may contain a significant amount of $CO_2$. If the temperature drops too low as a result of the gas expansion provided during the pressure-let down process, the mixture may undergo a phase change (e.g., become liquid). This phase change may occur within the pressure let down system and/or within the tank. A phase change can cause difficulty in downstream processing, and it may be advantageous to avoid phase changes to ensure trouble-free operation. For example, phase changes may result in operation and/or maintenance problems (e.g., solid $CO_2$ may clog valves or affect regulators). In addition, phase changes may alter the composition of the $CO_2/CH_4$ mixture being removed, and thus may introduce issues with regard to downstream processing.

In accordance with one embodiment of the invention, biogas is removed from a pressurized tank while avoiding two-phase (e.g., gas-liquid) or three-phase (e.g., gas-liquid-solid) systems. In one embodiment, the phase change is avoided by introducing a relatively warm gas (e.g., a warming gas) into the tank being depressurized (e.g., before the tank is depressurized to the final desired level). In one embodiment, the warming gas is introduced while the depressurization is temporarily paused (e.g., such that there is an alternating depressurization/repressurization of the tank, with a net depressurization). In one embodiment, the warming gas is introduced while the depressurization continues. In any case, introducing the relatively warm gas into the tank provides both heat and mass, and thus increases the enthalpy of the system. This can prevent a multi-phase system in both the tank and the pressure let down system.

Referring to FIG. 1, there is shown a method in accordance with one embodiment of the invention. In 10, raw biogas is obtained (e.g., collected from the source). In 20, the raw biogas, which contains both $CH_4$ and $CO_2$, is optionally subjected to a partial purification process (e.g., that removes $H_2O$, $H_2S$, and/or $CO_2$) to produce partially purified biogas. In 30, the biogas (e.g., raw or partially purified) is compressed and fed to a mobile tank. In 40, the pressurized mobile tank is transported (e.g., by truck, rail, or ship) to a receiving station at a central processing facility or in fluid communication with the central processing facility. In 50, the biogas is removed from the mobile tank. In 60, the gas removed from the mobile tank is processed in a central processing facility (e.g., a biogas upgrading facility, a chemical production facility, and/or a fuel production facility).

Figure 2:
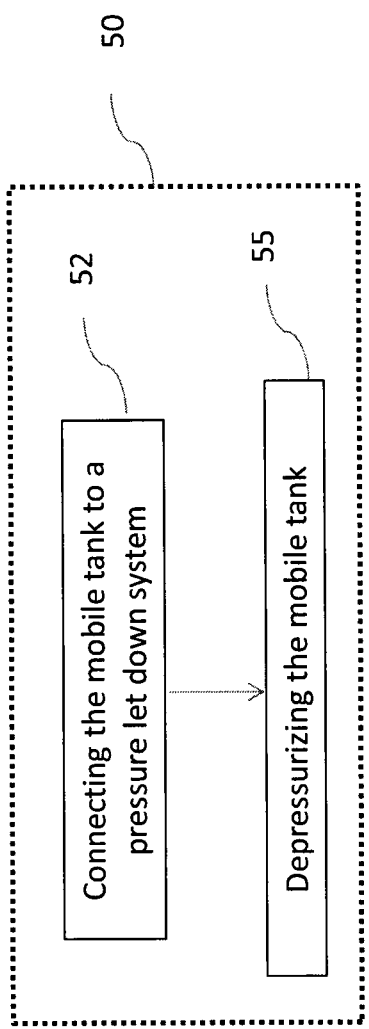
FIG. 2 is a flow diagram of a method according to one embodiment of the invention.

Referring to FIG. 2, removing the biogas (e.g., raw or partially purified) from the mobile tank 50 may include connecting the mobile tank to a pressure let down system 52 and depressurizing the mobile tank 55 (e.g., from the initial pressure to some final pressure).

Figure 3:
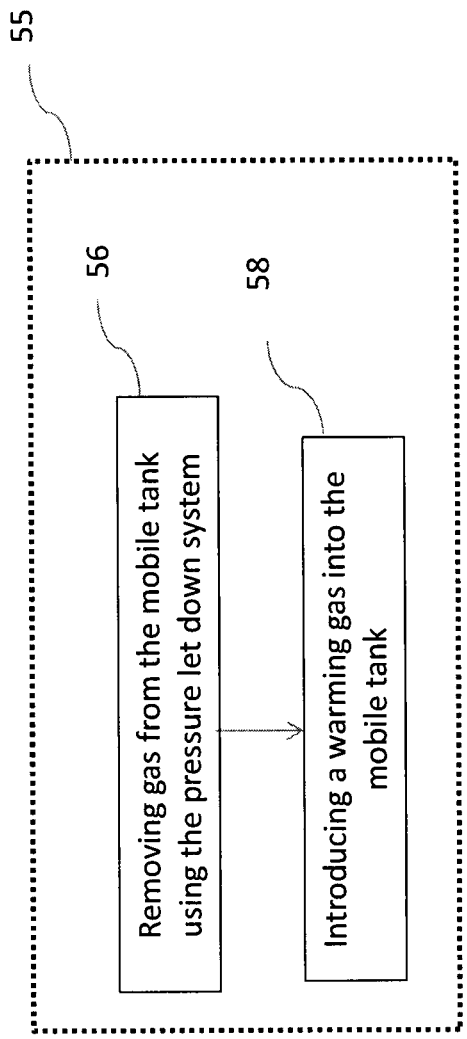
FIG. 3 is a flow diagram of a method according to one embodiment of the invention.

Referring to FIG. 3, depressurizing the mobile tank 55 may include removing gas from the mobile tank using the pressure let down system 56 and introducing a warming gas into the mobile tank 58. In general, the steps of removing gas from the mobile tank 56 and introducing a warming gas into the mobile tank 58 may occur simultaneously, sequentially (in any order), or repeatedly (e.g., in an iterative alternating manner). For example, with regard to the latter, the depressurization 55 may occur in multiple stages, wherein each stage repeats steps 56 and 58 such that the pressure of the mobile tank swings between high and lower values, with a net pressure reduction, until it reaches the final desired pressure.

Figure 4:
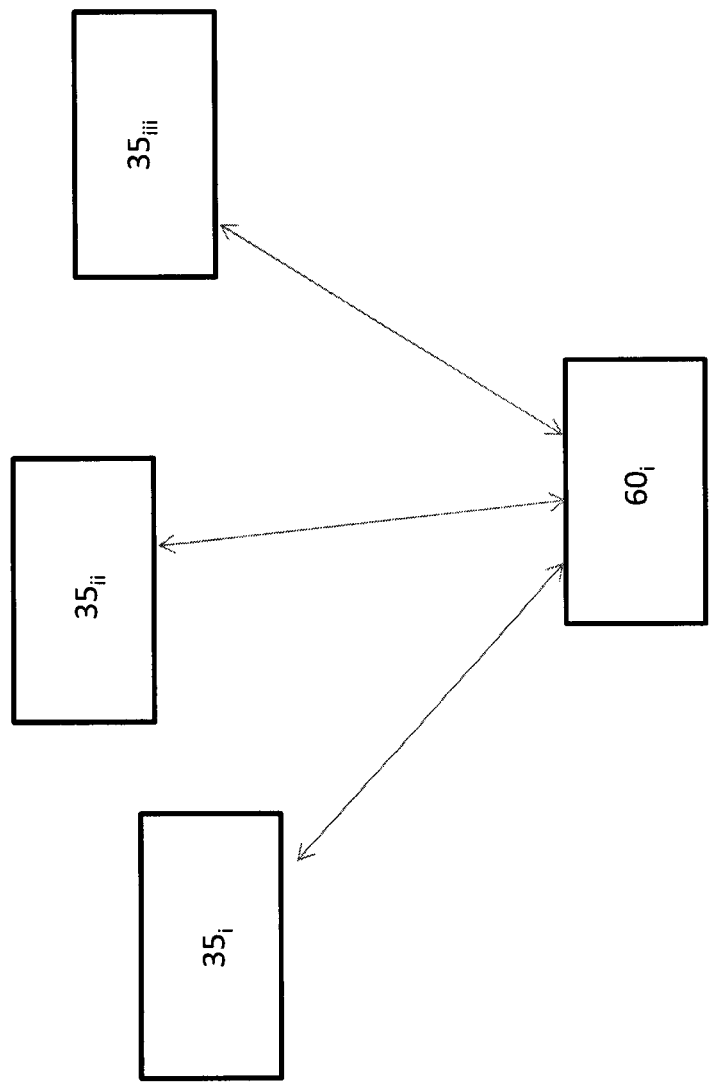
FIG. 4 is a schematic diagram of a system in accordance with an embodiment of the invention.

Referring to FIG. 4, the steps of obtaining raw biogas 10, optionally partially purifying the raw biogas 20, and compressing and feeding the biogas (e.g., raw or partially purified) to a mobile tank 30, collectively represented as 35, may be performed at a plurality of biogas plants or pre-processing sites $35_i$, $35_{ii}$, $35_{iii}$. The pressurized mobile tank from each plant/site may then be transported to a receiving station at or in fluid communication with the central processing facility 60, (e.g., via truck, ship, or rail). The receiving station may include one or more receiving terminals. Each receiving terminal may be in fluid communication with one or more pressure let down systems.

Biogas Production

In general, the raw biogas obtained in 10 can be obtained from any source that produces biogas (e.g., a landfill or an anaerobic digester) as is known to those skilled in the art. For example, the biogas may be obtained from a landfill biogas plant and/or from a biogas plant that includes one or more anaerobic digesters.

In embodiments where the biogas is obtained from a biogas plant that includes one or more anaerobic digesters, the digesters may be connected in series and/or in parallel, may be single-stage or multi-stage digestion systems, and/or may be designed and/or operated in a number of configurations including batch or continuous, mesophilic or thermophilic temperature ranges, and low, medium, or high rates. In addition, in embodiments where the biogas is obtained from a biogas plant that includes one or more anaerobic digesters, the digesters may be used for digesting agricultural organics (e.g., manure, crop residues, or energy crops), residential or commercial source separated organics (SSOs), wastewater treatment sludge, or industrial waste.

In one embodiment, the biogas is obtained from one or more anaerobic digesters used for treating wastewater, wastes, and/or residues from an ethanol production process. In one embodiment, the biogas is obtained from one or more anaerobic digesters used for treating manure (e.g., dairy or swine). In one embodiment, the biogas is obtained from a landfill. In one embodiment, the biogas is obtained from one or more anaerobic digesters used for treating waste water in a waste water treatment plant (WWTP). In one embodiment, the biogas is obtained from one or more anaerobic digesters used for treating SSOs. In one embodiment, the biogas is obtained from one or more anaerobic digesters used for treating industrial waste. In one embodiment, the biogas is obtained from one or more anaerobic digesters used for treating manure, crop residues, and/or energy crops.

In general, each biogas source may produce biogas at any rate. However, it may be particularly advantageous to use mobile tanks to collect biogas from biogas sources that produce smaller volumes (e.g., less than 6000 SCFM (standard cubic feet per minute)) and are not readily connected to an existing biogas pipeline. In one embodiment the biogas source produces raw biogas at a rate less than 5000 SCFM. In one embodiment the biogas source produces raw biogas at a rate between 100 and 3000 SCFM. In one embodiment the biogas source produces raw biogas at a rate between 1000 and 3000 SCFM. In one embodiment the biogas source produces raw biogas at a rate between 1500 and 3000 SCFM.

In general, the biogas obtained from the biogas source may have any composition. For example, raw biogas may have a $CH_4$ content between about 35% and 70% (e.g., average of about 60%) and a $CO_2$ content between about 25% and 65% (e.g., average of about 45%). In one embodiment, the raw biogas has a methane content between about 25% and 75% and a carbon dioxide content between about 15% and 65%, and the carbon dioxide and methane make up at least 75% of the biogas by volume. The percentages used to quantify gas composition and/or a specific gas content, as used herein, are expressed as mol %, unless otherwise specified.

Partial Purification

In general, the optional partial purification in 20 may remove $H_2O$, $H_2S$, and/or $CO_2$ from raw biogas to provide partially purified biogas having a $H_2O$ content, $H_2S$ content, and/or $CO_2$ content that is less than that of the raw biogas. Optionally, one or more other non-methane components are removed.

In one embodiment, the partially purified biogas has a $CO_2$ content that is sufficiently high that, when the partially purified biogas is pressurized to above 2000 psig, may form liquid or solid $CO_2$ upon depressurization to less than 500 psig. For example, in one embodiment the $CO_2$ content is greater than about 8%, greater than about 10%, greater than about 15%, greater than about 20%, or greater than about 25%.

The partial purification may be provided using any suitable method/technology, or combination of methods/technologies, in one or more stages, as known in the art. For example, $H_2O$ may be removed using a standard biogas dehumidifier, whereas $H_2S$ may be removed using a commercial $H_2S$ removal unit (e.g., based on activated carbon, molecular sieve, iron sponge, water scrubbing, NaOH washing, and/or biofilter or biotrickling filter technologies). Some $H_2S$ may also be removed during the water removal step, if present. $O_2$ may be removed by catalytic oxidation, membranes, or low pressure pressure swing adsorption (PSA). $CO_2$ may be removed by absorption (e.g., water scrubbing, organic physical scrubbing, chemical scrubbing), PSA, membrane permeation, and/or cryogenic upgrading. In one embodiment, the partial purification system includes a dehumidifier, a scrubber, a membrane unit, a solvent extraction unit, a pressure swing adsorption unit, and/or a cryogenic unit.

In one embodiment, the partial purification is essentially a cleaning or pre-cleaning stage that does not significantly remove $CO_2$ or $N_2$. For example, in one embodiment, the partial purification removes $H_2O$ and/or $H_2S$, but does not significantly remove $CO_2$ or $N_2$.

In one embodiment, the partial purification removes $H_2O$. Raw biogas may be fully saturated with water vapour and/or may have a water content of about 7% (at 40° C.). Removing $H_2O$ is advantageous since moisture can condense into water or ice when passing from high to low pressure systems, which may cause corrosion, may result in clogging, and/or may interfere with gas flow and pressure measurements (e.g., causing system control problems). In addition, the presence of water may cause hydrates to form. In one embodiment, the partial purification removes more than 90%, 92%, 94%, 96%, or 98% of the $H_2O$ present in the raw biogas. In one embodiment, the partial purification removes more than 99% of the $H_2O$ present in the raw biogas. In one embodiment, the partial purification removes sufficient $H_2O$ from the raw biogas that the $H_2O$ content of partially purified biogas more than meets the $H_2O$ content specifications for RNG. In one embodiment, the partial purification removes sufficient moisture to provide the partially purified biogas with a $H_2O$ concentration less than 0.4 g/m3 of biogas. In one embodiment, the partial purification removes sufficient moisture to provide the partially purified biogas with a $H_2O$ concentration less than 0.2 g/m3 of biogas.

In one embodiment, the partial purification removes $H_2S$. Raw biogas may have a $H_2S$ concentration between about 0 and about 6700 ppm(v) (e.g., 0-10,000 $mg/m^3$). For example, without being limiting, biogas derived from agricultural waste may have a $H_2S$ concentration between 0-4000 ppm(v), whereas biogas from a landfill may have a $H_2S$ concentration between 0 and 1000 ppm(v). $H_2S$ is both poisonous and corrosive, and can damage piping, equipment, and instrumentation. $H_2S$ can be reactive with many metals, and the reactivity can be higher at higher concentration and pressure, and/or in the presence of water. In one embodiment, the partial purification removes more than 90%, 92%, 94%, 96%, or 98% of the $H_2S$ present in the raw biogas. In one embodiment, the partial purification removes more than 99% of the $H_2S$ present in the raw biogas. In one embodiment, the partial purification removes sufficient $H_2S$ from the raw biogas that the $H_2S$ content of partially purified biogas more than meets the $H_2S$ content specifications for RNG. In one embodiment, the partial purification 20 does not remove $H_2S$. In one embodiment, the partial purification removes sufficient $H_2S$ from the raw biogas that the $H_2S$ concentration of partially purified biogas is less than 200 ppm(v). In one embodiment, the partial purification removes sufficient $H_2S$ from the raw biogas that the $H_2S$ concentration of partially purified biogas is less than 100 ppm(v). In one embodiment, the partial purification removes sufficient $H_2S$ from the raw biogas that the $H_2S$ concentration of partially purified biogas is between 20 ppm(v) and 50 ppm(v). In one embodiment, the partial purification removes sufficient $H_2S$ from the raw biogas that the $H_2S$ concentration of partially purified biogas is less than about 6 ppm(v). In one embodiment, the partial purification includes a first stage of $H_2S$ removal (e.g., biological) followed by second stage of $H_2S$ removal (e.g., an adsorption bed), which may or may not be consecutive.

In one embodiment, the partial purification removes both $H_2O$ and $H_2S$. Contaminants such as $O_2$, $NH_3$, VOCs, siloxanes, and/or particulates are optionally removed, although this is not necessary. Removing $H_2O$ and $H_2S$ may be advantageous during the partial purification because the combination of $H_2O$ and $H_2S$ can cause corrosion problems.

In one embodiment, the partial purification removes $CO_2$. Contaminants such as $H_2O$, $H_2S$, $O_2$. $NH_3$, VOCs, siloxanes, and/or particulates are optionally removed. Removing $CO_2$ may be advantageous because it can reduce the amount of gas that needs to be compressed and/or transported. In one embodiment, about 20 to about 80% of the $CO_2$ in the raw biogas is removed.

Compressing the Biogas

In general, the biogas (e.g., raw or partially purified) compressed in 30 can be fed to any suitable mobile tank. For example, the mobile tank may be any vessel that is movable from one location to another and that can be used to hold the pressurized biogas.

In one embodiment the mobile tank includes one or more cylinders mounted to a truck. In one embodiment, the mobile tank includes one or more cylinders mounted to and/or within a trailer, skid, or shipping container. In one embodiment, the trailer, skid, or shipping container is attachable and detachable from a truck. For example, in one embodiment, the mobile tank is part of a tube trailer or a cylinder trailer. When the mobile tank includes one or more cylinders, the cylinders are interconnected, and may be mounted vertically or horizontally. In one embodiment, the mobile tank has a single inlet/outlet. In one embodiment, the mobile tank has multiple inlet/outlets (e.g., a separate inlet and outlet). In one embodiment the mobile tank includes multiple interconnected cylinders, wherein one inlet/out is on one cylinder and another inlet/outlet is on another cylinder. In one embodiment the mobile tank includes multiple cylinders, where each cylinder is connected to a common manifold that has an inlet/outlet. In one embodiment the mobile tank includes multiple cylinders, where each cylinder is connected to a first manifold that has a first inlet/outlet, and a second manifold that has a second inlet/outlet.

In general, the mobile tank may be constructed of any material and thickness suitable for holding the biogas (e.g., raw or partially purified) at the desired transport pressure (e.g., greater than about 1000 psig). For example, the mobile tank may be fabricated from carbon steel, stainless steel, or a composite material. Composite materials are advantageous in that it may be possible to transport more gas per truck. In one embodiment, the mobile tank is part of a CNG truck, CNG trailer, or CNG tanker.

In one embodiment, the mobile tank is constructed to facilitate heat transfer between the gas in the mobile tank and air outside the mobile tank. In one embodiment, the mobile tank is provided with a heater to warm gas within the tank through the walls of the tank (e.g., hot fluid or electric). In one embodiment, the mobile tank includes a heater (e.g., heating coil) disposed within the tank. In one embodiment, the mobile tank includes equipment that mixes gases within the mobile tank.

In general, the size of the mobile tank may be sufficient to transport the biogas (e.g., raw or partially purified) in relatively large quantities (e.g., bulk quantities). For example, in one embodiment the mobile tank has an internal volume of at least 5,000 L, at least 10,000 L, or at least L (water volume). In one embodiment the mobile tank has an internal volume between about 10,000 L and about 100,000 L (water volume). In one embodiment the mobile tank has an internal volume between about 20,000 L and about 60,000 L (water volume). In one embodiment the mobile tank can store at least 100,000 SCF, at least 150,000 SCF, at least 200,000 SCF, or least 400,000 SCF of CNG (at 59° F. and 3600 psig). In one embodiment the mobile tank can store between about 200,000 SCF and about 640,000 SCF of CNG (at 59° F. and 3600 psig). In one embodiment the mobile tank can store about 425,000 SCF of CNG (at 59° F. and 3600 psig). In one embodiment, the mobile tank can store at least about 5 tonnes of biogas, at least about 7.5 tonnes of biogas, at least about 10 tonnes of biogas, or at least about 12.5 tonnes of biogas. In one embodiment, the mobile tank can store between about 5 tonnes and about 15 tonnes of biogas. In one embodiment, the mobile tank stores between about 11 and about 13 tonnes of biogas having a $CO_2$ content between about 20% and about 40%. In one embodiment, the gross weight of biogas and truck is about 80,000 lbs.

The biogas (e.g., raw or partially purified) may be fed to the mobile tank directly (e.g., as it is produced) or indirectly (e.g., via buffer storage). In many instances, raw biogas may be obtained at pressures less than 10 psig (e.g., 2-3 psig). Depending on the system and/or technology used for the optional partial purification, the pressure of partially purified biogas may be at a higher pressure (e.g., about 200 psig for a membrane separation).

In general, the biogas (e.g., raw or partially purified) will be compressed as it fills the mobile tank. As a result, the pressure of the biogas will increase from a relatively low value (e.g., 2-3 psig or 200 psig) to a relatively high value (e.g. greater than 1000 psig) near the end of the filling process. In general, this pressurization may be achieved using one or more compressors, each of which may be a multistage compressor. For simplicity, such compressor systems may be referred to simply as a "compressor." In one embodiment, the compressor includes a standard CNG compressor. In one embodiment, the compressor includes a 3-stage non-lubricated compressor.

In one embodiment, the biogas (e.g., raw or partially purified) is pressurized to more than about 1000 psig, more than about 1500 psig, more than about 2000 psig, more than about 2200 psig, more than about 2400 psig, more than about 2600 psig, more than about 2800 psig, or more than about 3000 psig. In one embodiment, the raw or partially purified biogas is pressurized to at least 1000 psig, at least 1500 psig, at least 2000 psig, at least 2200 psig, at least 2400 psig, at least 2600 psig, at least 2800 psig, or at least 3000 psig.

Compressing a relatively large volume of gas to more than 1000 psig can significantly increase the temperature of the gas. In one embodiment, a cooler or heat exchanger is provided to cool the biogas (before and/or after the compression), thereby reducing the temperature of the biogas in the tank. In one embodiment, the biogas is cooled to less than 40° C. in order to increase the amount of biogas that can be transported. In one embodiment, the level of cooling is limited such that temperature in the tank is relatively high (e.g., relative to ambient). For example, in one embodiment, the level of cooling is selected such that the gas in the mobile tank is transported at a temperature greater than 40° C., greater than 50° C., greater than 60° C., greater than 70°, greater than 80° C., or greater than 90° C. Transporting the gas at a relatively high temperature (e.g., 60° C.) advantageously may reduce the heat required during depressurization of the tank.

In one embodiment, the biogas (e.g., raw or partially purified) is compressed and fed to a plurality of mobile tanks. In this embodiment, the biogas may be fed to the mobile tanks one at a time or in parallel (e.g., simultaneously). For example, in one embodiment, the biogas (e.g., raw or partially purified) is fed to a single trailer until the trailer is at capacity before the biogas is fed to another trailer. In one embodiment, biogas is simultaneously fed to a plurality of trailers. Feeding the biogas to a plurality of trailers is advantageous in that the fill rate may be lower. A lower fill rate may allow more time for the heat generated from the compression to dissipate and/or may increase the time between collections.

In one embodiment, once a mobile tank is at the desired fill level (e.g., at capacity), the entire mobile tank can be collected (e.g., picked-up) and/or transported to the receiving station at or in fluid communication with a central processing facility. For example, if the mobile tank is part of a truck, the truck may be driven to the central processing facility. If the mobile tank is mounted to or mounted within a skid, trailer, or shipping container, the mobile tank platform may be loaded directly onto or otherwise coupled to the mode of transportation (e.g., a vehicle such as a truck, truck tractor, ship, rail car) for transport to the central processing facility. For example, a tube trailer can be temporarily parked at the pre-processing site until it is filled and/or collection is arranged, at which point it is detachably coupled to the truck tractor, and transported to the central processing facility.

A mobile tank including a plurality of gas cylinders collectively capable of containing more than 200,000 SCF of biogas (at 59° F. and 3000 psig) may take several hours to fill (e.g., between about 1 to 3 hours, or about 1.5 hours).

Transporting the Biogas

In general, once the mobile tank has been filled, the mobile tank and/or other mobile tanks may be collected (e.g., picked-up) and transported 40.

In one embodiment, the mobile tank is transported at least some distance by truck, rail, or ship. For example, in one embodiment, where the mobile tank is mounted on some platform as it is filled (e.g., a skid or shipping container), the entire platform is loaded on onto a truck bed or trailer bed for transport. In one embodiment, where the mobile tank is mounted to a trailer as it is filled, the trailer is coupled to a truck (e.g., a towing truck, a tractor unit, a leading trailer, or some prime moving vehicle) for transport.

In general, the mobile tank will be transported to a receiving station (e.g., at the central processing facility). For example, in one embodiment, a trailer including one or more mobile tanks containing high pressure (e.g., 3000 psig) biogas is collected from a biogas plant and/or pre-processing site and is transported to the receiving station, where it is unloaded. A trailer containing one or more empty mobile tanks (e.g., at a pressure of about 200 psig or below) may then be transported back to the biogas plant and/or pre-processing site, or another biogas plant or pre-processing site, for exchange with a full trailer.

In one embodiment, a plurality of trucks is provided to transport mobile tanks between the biogas sources/pre-processing sites and the receiving station. In one embodiment, the trucks are fueled by biogas, partially purified biogas, RNG, or natural gas (e.g., compressed or liquefied RNG or natural gas).

In general, it may be advantageous for more than one mobile tank to be temporarily stationed at the receiving station and/or at the biogas source/pre-processing site. For example, providing more than one mobile tank at the biogas source/pre-processing site may allow more than one mobile tank to be filled at a time, may ensure continuous operation, and/or may extend the time between collections. For example, in one embodiment, each mobile tank is integrated with trailer, which can be transported in double or triple trailer configuration. In general, the number of mobile tanks (e.g., number of trailers) temporarily associated with a biogas source/pre-preprocessing site may depend on the production rate of raw biogas and/or the distance to the receiving station. Providing more than one mobile tank at the receiving station may ensure a continuous supply of raw or partially purified biogas (e.g., continuous off-loading of biogas). In addition, providing more than one mobile tank at the receiving station may allow one mobile tank to be depressurized while another mobile tank is used as supply tank for providing a warming gas.

In general, the receiving station may include one or more receiving terminals. Each receiving terminal may include space for accommodating the mobile tank platform (e.g., truck, trailer, skid, or shipping container), and equipment for connecting the mobile tank to a pressure let down system (e.g., providing fluid communication with). For example, in one embodiment, the receiving terminal includes one or more hoses, nozzles, couplings, filters, and/or valves (e.g., ball valves).

Figure 5:
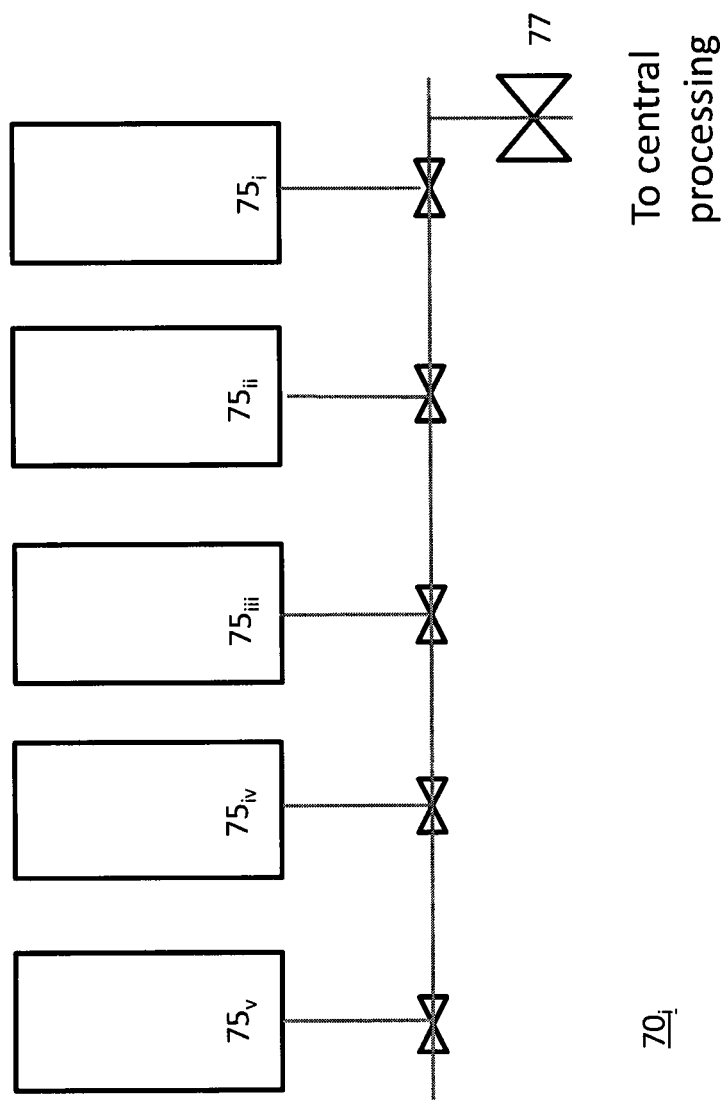
FIG. 5 is a schematic diagram of a receiving station in accordance with one embodiment of the invention.

In one embodiment, the one or more receiving terminals are connected to the pressure let down system via a manifold having a plurality of valves that can provide isolation, pressure regulation, and/or directional flow control, between different receiving terminals, or between each receiving terminal and the pressure let down system. For example, FIG. 5 shows an embodiment of a receiving station $70_i$ having a plurality of receiving terminals $75_{i-v}$, which are connected to a single common pressure let down system 77 via a manifold equipped with valves. In another embodiment (now shown), each receiving terminal is connected to a separate pressure let down system.

Removing Biogas from Mobile Tank

Once a mobile tank is temporarily stationed at a receiving station, the biogas (e.g., raw or partially purified) may be removed from the mobile tank. In one embodiment, removing the biogas from the mobile tank includes connecting the mobile tank to a pressure let down system and depressurizing the mobile tank.

In one embodiment, depressurizing the mobile tank includes reducing the pressure of gas in the mobile tank from a first pressure to a second pressure. The first pressure, which may be referred to as the initial pressure, the upper pressure, or the transport pressure, may be close to the maximum pressure at which the mobile tank can transport the raw or partially purified biogas (e.g., based on design capacity and/or weight). The second pressure, which may be referred to as the final pressure, the lower pressure, or the heel pressure, may be close to atmospheric pressure or the mobile tanks minimum pressure for transport. For example, mobile tanks utilizing a bladder may require a heel pressure of about 200 psig.

In general, the mobile tank may be connected (e.g., directly or indirectly) to the pressure let down system. For example, in one embodiment the mobile tank is connected (e.g., via high pressure piping or flexible hose) to a pipeline that provides fluid communication with the pressure let down system. The term "pipeline", as used herein, refers to a single pipe or an interconnected network of pipes (i.e., physically connected), including any associated pumps and valves. In one embodiment the mobile tank is connected (e.g., via high pressure piping or flexible hose) to a manifold that provides fluid communication with the pressure let down system.

In general, the pressure let down system is any system that can reduce the pressure of the gas to the desired level. For example, the pressure let down system may include a mechanical regulating device (e.g., a pressure regulator or control valve) to reduce the pressure. In one embodiment, the pressure let down system includes a pressure regulator, a temperature and/or pressure sensor, one or more valves, a metering system, a control system, and/or temperature control (e.g., a heater). With regard to the latter, the expansion or throttling of a gas provided by a pressure regulator results in a Joule-Thomson cooling of the gas. In one embodiment, the pressure let down system includes a heater upstream and/or downstream of the pressure regulator. In one embodiment, the heater(s) is a commercially available gas line heater (e.g., for natural gas). In one embodiment, the heater(s) is a heat exchanger. In one embodiment, the heat supplied to the heat exchanger is supplied by fired natural gas, CNG, raw, or partially purified biogas. In one embodiment, the heat supplied to the heat exchanger is supplied by a heated liquid bath, an electric heater, or a cross-exchange with a hot process. In one embodiment, the heater(s) is a catalytic heater, electric heater, hot water heater, hot oil heater, or heater glycol system.

In one embodiment, the pressure let down system includes a scavenging compressor for removing the gas at low pressures. In one embodiment, the pressure let down system includes a turboexpander. A turboexpander is a centrifugal or axial flow turbine through which a high pressure gas is expanded to produce work. For example, a turboexpander typically includes a turbine connected to a load device (e.g., a compressor, a generator, or brakes) by a shaft. As high pressure gas flows into the turboexpander it spins the centrifugal or axial flow turbine. The kinetic energy from the pressure letdown may thus be converted into useful mechanical energy, which may be used to drive a compressor or generator (e.g., for producing electricity or for direct drive of a compressor). In one embodiment, this energy is used at the receiving station (e.g., for compression). In one embodiment, the pressure let down system includes a venturi pump.

In embodiments where the pressure let down system includes one or more heaters (e.g., heat exchange systems), the heaters may prevent freezing of downstream sensitive instruments and pipelines (e.g., caused by the Joule-Thomson effect). However, such gas-line heaters do not address the temperature drop of gas within the mobile tank (which also undergoes an expansion).

A large temperature drop is generally expected within the mobile tank when depressurizing tanks from over 3000 psig down to below 500 psig. For example, a mobile tank containing CNG at about 3600 psig may cool to −60° C. or −80° C. when depressurized to atmospheric pressure, or down to about −55° C. when depressurized down to 200 psig. For CNG, which is predominately methane (e.g., ~97%), the mixture may remain a gas during this pressure drop. However, for a $CO_2/CH_4$ mixture having a $CO_2$ content that is greater than about 10%, greater than about 20%, or greater than about 25%, this temperature drop may be particularly problematic. For example, if the temperature within the mobile tank approaches the dew point of the mixture (e.g., at a specific temperature and pressure), the gas mixture may condense. Once liquid is formed, and the pressure continues to reduce, the liquid may boil, extracting significant heat from the mobile tank. This may affect the mechanical properties (e.g., cause material fatigue), and thus may affect the maintenance and/or lifetime of the mobile tank. In some cases, the temperature and/or pressure drop may cause solids (e.g., solid $CO_2$) to form, which may clog valves.

In accordance with one embodiment of the invention, a phase change is avoided by introducing a warming gas into the mobile tank before it is fully depressurized to the desired pressure.

In one embodiment, the depressurization reduces the pressure from an initial pressure that is greater than about 1000 psig, to a final pressure that is below about 500 psig, below about 400 psig, below about 300 psig, below about 200 psig, or below about 100 psig. In one embodiment, the depressurization reduces the pressure from an initial pressure that is greater than about 2000 psig, to a final pressure that is below about 500 psig, below about 400 psig, below about 300 psig, below about 200 psig, or below about 100 psig. In one embodiment, the depressurization reduces the pressure from an initial pressure that is greater than about 2500 psig, to a final pressure that is below about 500 psig, below about 400 psig, below about 300 psig, below about 200 psig, or below about 100 psig. In one embodiment, the mobile tank is depressurized to atmospheric pressure. In one embodiment, the mobile tank is depressurized to a final pressure between about 150 psig and about 300 psig.

In one embodiment, the depressurization reduces the pressure from an initial pressure to a final pressure by removing at least 50%, at least 60%, at least 70%, at least 80%, at least 90%, or at least 95% of the biogas initially present in the mobile tank (e.g., by mass).

In one embodiment, the temperature of the mobile tank before depressurization is between about 0° C. and about 70° C. For example, the temperature of gas in mobile tank may reflect ambient temperatures (e.g., winter temperatures) and/or may be related to process conditions (e.g., heat added during compression while filling the mobile tank).

While it may seem counterintuitive to introduce a gas during a depressurizing process, particularly when the goal is to unload gas from the mobile tank for further processing, doing so may have some advantages. In particular, adding a warming gas can introduce both energy (e.g., heat) and mass into the mobile tank, thereby increasing the enthalpy of the gas in the mobile tank. By increasing the enthalpy of the gas in the mobile tank, the temperature and the pressure are likely to increase. The entropy also increases, which may be beneficial in terms of avoiding a phase change for a subsequent depressurization.

Another advantage of this approach is that introducing a warming gas into the mobile tank during the depressurization of the mobile tank can increase the temperature of both the gas within the tank and the output gas (e.g., provided to downstream processing). Accordingly, this approach may prevent a phase change within the tank, which cannot be prevented with gas line heaters in a pressure let down system. In some cases, introducing the warming gas may obviate or reduce the need for pre or post gas line heating in the pressure let down system.

Advantageously, this approach to preventing a phase change may provide a faster depressurization time than an approach wherein the depressurization time is extended to allow heat transfer to the surroundings and thus avoid a phase change. In addition, this approach to preventing a phase change may be simpler, less expensive, and/or easier to implement than providing a heater or heat exchanger within the tank/vehicle. Furthermore, this approach to preventing a phase change may be more efficient than providing limited depressurization. With regard to the latter, while limiting the depressurization such that the tank is depressurized from about 3000 psig to about 1000 psig, may avoid a phase change, it may also leave about half of the biogas in the mobile tank. It is inefficient to transport half of the biogas back to the pre-processing site for filling. By introducing a warming gas into the mobile tank, all or most of the biogas within the tank may be removed.

In one embodiment, the warming gas is raw biogas. In one embodiment, the warming gas is partially purified biogas. In one embodiment, the warming gas is RNG. In one embodiment, the warming gas is natural gas (NG) or compressed natural gas (CNG). Using raw biogas, partially purified biogas, RNG, NG, or CNG is advantageous in that no new components that need to be removed are introduced.

In one embodiment, the warming gas is obtained from the same tank into which it is to be injected (e.g., the warming gas is raw biogas or partially purified biogas). In this embodiment, the warming gas typically is heated after it is removed from the mobile tank and before it is reinjected, such that a warming loop provided. In this embodiment, a compressor may be used to repressurize the warming gas. In one embodiment, the mobile tank has two inlet/outlets, one for withdrawing biogas to be heated and one for injecting the warming gas, and a warming loop that includes a gas line heater (e.g., heat exchanger). In one embodiment, the warming loop is used to heat the biogas prior to starting the depressurization process. In one embodiment, the warming loop is used to heat the biogas during the depressurization process. In one embodiment, the warming gas is obtained from another tank. In this case, the tank providing the warming gas may be referred to as the supply tank and the mobile tank into which the warming gas is injected (e.g., primary tank being depressurized) may be referred to as the receiving tank.

In one embodiment, the supply tank is a separate mobile tank containing raw biogas or partially purified biogas. In this embodiment, the warming gas may or may not be heated prior to being injected into the receiving tank. Sourcing the warming gas from a different mobile tank is particularly advantageous. For example, it can mix biogas from a plurality of biogas sources, which may dilute impurities and/or improve feed consistency. Moreover, since the supply tank may be a "full" mobile tank (e.g., at 3600 psig), while the receiving tank is only "partially full" (e.g., at 1000 psig), the injection of the warming gas into the receiving tank may be pressure driven. Accordingly, the pressure differential may be selected to obviate the need for a compressor for injecting the warming gas. In one embodiment, the pressure differential is greater than 200 psig, is greater than 300 psig, is greater than 500 psig, is greater than 750 psig, is greater than 1000 psig, is greater than 1500 psig, or is greater than 2000 psig. Although introducing the warming gas into the receiving tank increases the aggregate quantity of gas that is removed from the receiving tank, it may reduce the time to empty the tank by avoiding phase changes.

In one embodiment, the supply tank is a separate tank containing natural gas or RNG. For example, in one embodiment, the supply tank is a dedicated CNG tank or compressed RNG tank. RNG may, for example, be obtained by upgrading biogas at the central processing facility. Using RNG as the warming gas may be advantageous in cases where the raw biogas transported from the biogas plant/pre-processing site is relatively contaminated and/or in embodiments wherein the tank being depressurized has a separate inlet and outlet such that the warming gas helps to flush out the tank.

In one embodiment, temperature of the warming gas is at least 20° C. warmer, at least at least 30° C. warmer, at least 40° C. warmer, or at least 50° C. than the tank into which it is injected. In general, it may be advantageous for the warming gas to be at a temperature greater than about 15° C., greater than about 20° C., greater than about 25° C., greater than about 30° C., greater than about 40° C., greater than about 50° C., greater than about 60° C., greater than about 70° C., greater than about 80° C., greater than about 90° C., or greater than about 100° C. before being injected. In one embodiment, temperature of the warming gas is between about 30° C. and about 150° C. In one embodiment, temperature of the warming gas is between about 50° C. and about 90° C. In one embodiment, temperature of the warming gas is between about 40° C. and about 80° C.

In one embodiment, the warming gas is obtained from a warm tank. For example, in one embodiment, the supply tank is a mobile tank that arrives at the receiving station at a relatively warm temperature. For example, if limited cooling is providing during compression when the supply tank is being filled at the biogas plant/pre-processing site, depending on the travel distance, the supply tank could still be between 30° C. and 80° C. upon arrival at the receiving station. Alternatively, the supply tank may be a dedicated compressed RNG tank that is filled with limited cooling.

In one embodiment, the warming gas is heated after leaving the supply tank and before being injected into the receiving tank. For example, in one embodiment, the warming gas is heated using a gas line heater to at least 30° C., at least 40° C., at least 50° C., at least 60° C., at least 70° C., at least 80° C., or at least 90° C. before being injected. In one embodiment, the warming gas is heated to about 100° C. In one embodiment, the warming gas is heated to between about 30 and 150° C. In one embodiment, the warming gas is heated to between about 30 and 100° C. In one embodiment, the warming gas is heated to between about 30 and 90° C. In one embodiment, biogas removed from the supply tank is heated at a rate between about 200 to 1000 kW, between about 300 and 800 kW, or between about 350 and 700 kW. In one embodiment, the heat is added to the mobile tank at a rate of at least 250 to 400 kw.

In one embodiment, the heater is a commercially available gas line heater (e.g., for natural gas). In one embodiment, the heater is a heat exchanger. In one embodiment, the heat supplied to the heat exchanger is supplied by fired natural gas, CNG, raw or partially purified biogas. In one embodiment, the heat supplied to the heat exchanger is supplied by a catalytic heater, electric heater, or a heated liquid bath (hot water or hot oil or glycol). In one embodiment, the heat supplied to the heat exchanger is provided by a cross-exchange with a hot process at the central processing facility.

In one embodiment, the warming gas is injected into the receiving tank in an amount selected to sufficiently adjust the temperature of the receiving tank. In one embodiment, the amount of warming gas introduced into the receiving tank is at least 10%, at least 20%, at least 30%, at least 40%, or at least 50%, w/w, of the gas present in the receiving tank.

In one embodiment, the warming gas is injected into the receiving tank at a specific time (or times) selected in dependence upon the pressure and/or temperature. For example, in one embodiment, the warming gas is injected into the receiving tank at a pressure/temperature selected to avoid a phase change in the tank. Such pressures/temperatures may, for example, be calculated and/or obtained from look-up tables. In one embodiment, the pressures/temperatures are calculated assuming an adiabatic, isentropic decompression. In one embodiment, the pressures/temperatures are calculated assuming a deviation from an adiabatic, isentropic decompression. For example, thermodynamic curves and the dew line, which corresponds to the boundary at which a gas beings to condense, can be calculated or simulated for a certain system (e.g., for a certain amount and/or composition of gas), as is known in the art. In one embodiment, the injection of the warming gas is timed to correspond to a pressure/temperature that prevents the system from approaching that dew point. For example, it has been calculated that a mixture of about 50% $CH_4$, 38% $CO_2$, 10% $N_2$, and 2% $O_2$, and, weighing about 11.78 tonnes, at about 60° C., and pressurized to about 3000 psig, can be depressurized down to 920 psig (−23° C.) without reaching the dew point (e.g., calculated to be −28° C.), assuming an adiabatic isentropic decompression.

In one embodiment, the warming gas is introduced into the receiving tank when the pressure of the receiving tank is less than about 1000 psig, less than about 900 psig, or less than about 800 psig. In one embodiment, the warming gas is introduced into the receiving tank when the pressure of the receiving tank is between 500 psig and 1500 psig, between 800 psig and 1200 psig, or between about 900 and 1100 psig. In one embodiment, the warming gas is introduced into the receiving tank in dependence upon an automated control system that uses monitored temperature and/or pressure (e.g., to avoid the phase change).

In one embodiment, the warming gas is injected into the receiving tank only once during the depressurization of the mobile tank. In one embodiment, the warming gas is injected continuously into receiving tank for a specific duration (e.g., 25% of the decanting time).

In one embodiment, warming gas is injected into the receiving tank multiple times during the depressurization of the mobile tank. For example, in one embodiment, the mobile tank is depressurized from the initial pressure to the final pressure in a multi-stage process, wherein each stage includes a) removing gas from the mobile tank (e.g., a pressure reduction step) and b) introducing warming gas into the mobile tank (e.g., a repressurization step). In one embodiment, the depressurization is achieved in 2 stages, in 3 stages, in 4 stages, in 5 stages, or in more than 5 stages.

In one embodiment, the pressure reduction and repressurization steps in each stage are performed sequentially such that each repressurization step is followed by a pressure reduction step and such that the average pressure in each successive stage is stepped down until the pressure reaches the final desired pressure. In this embodiment, the pressure swings between lower and higher values as it decreases.

In one embodiment, the warming gas is sourced from a supply tank that is at a higher pressure than the receiving tank. In this embodiment, the pressure differential may help drive the transfer of gas between mobile tanks. This embodiment is particularly advantageous when the receiving tank and supply tank are connected to manifold that can provide fluid communication between a plurality of mobile tanks, and that can provide isolation, pressure regulation, and/or directional flow control, between the different mobile tanks. For example, such a system may permit different approaches/strategies to selecting the pressure and/or composition of the supply tank. Advantageously, this embodiment may reduce operating costs.

In one embodiment, the warming gas is sourced from a supply tank that is at a lower pressure than the receiving tank. In this embodiment, a compressor may be used for transferring gas between mobile tanks.

In one embodiment, the receiving tank has two inlet/outlets, the first of which is connected to an outlet of the supply tank, and the second of which is connected to an inlet of the receiving terminal. A gas line heater is provided to heat the gas transferred from the supply tank to the receiving tank, as the mobile tanks are depressurized together. In one embodiment, the tank supplying the warming gas and the tank receiving the warming gas are at about the same pressure. In one embodiment, the tank supplying the warming gas is at a higher pressure than the tank receiving the warming gas.

In one embodiment, the mobile tank is depressurized with warming gas obtained from a single supply tank (e.g., during the depressurization of a given mobile tank there is only one receiving tank and only one supply tank). In one embodiment, the mobile tank is depressurized using warming gas obtained from a plurality of supply tanks. In this embodiment, the supply tank may be selected in dependence upon its instant pressure and the instant pressure of the receiving tank.

In one embodiment, the method and/or process is designed such that the pressure let down system depressurizes one tank fully before moving on to another. In this embodiment, one tank may function as the only receiving tank until depressurization thereof is complete. In one embodiment, the method and/or process is designed such that the pressure let down system depressurizes a plurality of tanks before the depressurization of one tank is complete. In this embodiment, each tank may be a supply tank and a receiving tank during the depressurization process of single tank. In one embodiment, the method and/or process is designed so that two tanks switch (e.g., alternate) between being a supply tank and a receiving tank. In this embodiment, a gas line heat exchanger and a compressor may be provided for heating and moving the gas between tanks.

As a given mobile tank is depressurized, the depressurized biogas may be fed to the central processing system (e.g., directly, or indirectly via buffer storage). In general, the depressurized biogas (e.g., raw or partially purified) may be of a temperature and/or pressure suitable for downstream processing. For example, in one embodiment, the depressurized biogas is warmed to prevent freezing of downstream equipment. In one embodiment, the depressurized biogas is relatively cold (e.g., relative to ambient). For example, some downstream processing, such as membrane separations, can benefit from higher pressures and/or lower temperatures. In one embodiment, the depressurized biogas fed to central processing has a pressure greater than 200 psig, greater than 500 psig, or greater than 750 psig, or greater than 800 psig. In one embodiment, the depressurized biogas fed to central processing has a pressure greater than 200 psig, greater than 500 psig, or greater than 750 psig, or greater than 800 psig, and a temperature not more than 20° C., not more than 10° C., not more than 0° C., not more than −10° C., not more than −20° C., or not more than −30° C.

Biogas Processing

In one embodiment, the central processing facility includes a biogas upgrading system. For example, in one embodiment the central processing facility is primarily a biogas upgrading facility. In this embodiment, the biogas upgrading facility may include an injection system for injecting RNG into a natural gas distribution system. In another embodiment, the central processing facility is primarily a chemical or fuel production facility, but includes a biogas upgrading system for removing one or more impurities prior to or as part of the chemical or fuel production process (e.g., produces RNG for use as a feedstock).

Biogas upgrading systems, which are well known in the art, may contain one or more systems for removing $CO_2$, $N_2$, $H_2O$, $H_2S$, $O_2$, $NH_3$, VOCs, siloxanes, and/or particulates. In general, these non-methane components may be removed by any combination of chemical and/or physical technologies, in one or more stages.

Water ($H_2O$) may be removed from the biogas by cooling, compression, absorption, adsorption, and/or coalescing filtration. For example, water may be removed by increasing the pressure or decreasing the temperature in order to cause the water to condense so that it may be removed. Alternatively, water may be removed by adsorption using silicon dioxide ($SiO_2$), activated carbon, or molecular sieves (e.g., PSA).

Hydrogen sulfide ($H_2S$) may be removed from the biogas by adsorption on activated carbon (e.g., impregnated activated carbon such as ZnO impregnated carbon), adsorption on molecular sieve, adsorption using iron oxides (e.g., iron oxide impregnated wood chips (iron sponge)), iron oxide pellets, or proprietary iron-oxide media), physical absorption (e.g., water scrubbing), chemical absorption (e.g., NaOH washing), and/or biofilters or biotrickling filters (e.g., where the biogas is forced through a moist, packed bed that contains microorganisms). Some $H_2S$ may also be removed during the water removal step, if present.

Siloxanes may be removed from the biogas by filtration (e.g., activated alumina, activated carbon, graphite filtration, or silica gels, which absorb siloxanes from biogas), by condensation or cryogenic techniques, using synthetic resins, using liquid absorbents (e.g., Selexol™), using membranes, and/or using biological processes.

Particulates (e.g., dust and/or dirt) may be removed by mechanical filters, centrifugal separation, screens, etc. In one embodiment, particulates are removed by a coarse particulate filter (e.g., 25 microns).

Nitrogen ($N_2$) may be removed from the biogas by pressure swing absorption (PSA), membranes, and/or cryogenic systems. Oxygen ($O_2$) may be removed by catalytic oxidation, membranes, or low pressure PSA. While $N_2$ and $O_2$ are not typically found in high concentrations in agricultural and/or farm based biogas, they, and in particular $N_2$, may be present in higher concentrations in landfill based biogas.

Carbon dioxide ($CO_2$) can be removed from biogas by absorption (e.g., water scrubbing, organic physical scrubbing, chemical scrubbing), PSA, membrane permeation, and/or cryogenic upgrading. For example, in one embodiment, the biogas upgrading system includes a dehumidifier, a scrubber, a membrane unit, a solvent extraction unit, a pressure swing adsorption unit, and/or a cryogenic unit.

In biogas upgrading, the non-methane (e.g., $CO_2$, $H_2S$, $H_2O$, $N_2$, $O_2$, VOCs, and/or siloxane) removal systems may be selected in dependence upon the source of the biogas, the non-methane components present, the desired purity, the capacity of the system, and other cleaning systems present, as would be understood by a person skilled in the art. For example, since each biogas source is unique, the biogas upgrading technology, configuration, and sizing of the system components is typically is selected in dependence upon the specific situation.

In accordance with one embodiment of the instant invention, biogas from a plurality of biogas sources is aggregated, thereby improving consistency of the process by averaging out the $CO_2/CH_4$ ratios, flow rates, and/or other variables. In addition, it may dilute impurities, thereby improving the upgrading process. Advantageously, collecting an aggregate of gas is advantageous because biogas upgrading can benefit from economies of scale.

In one embodiment, the central processing facility includes a chemical or fuel production system. In this this embodiment, the central processing facility optionally includes a biogas upgrading system. In one embodiment the central processing facility is primarily a chemical or fuel production facility. In one embodiment, the central processing facility is a chemical or fuel production facility that produces hydrogen, methanol, ethanol, gasoline, diesel, or dimethyl ether (DME) and that uses raw biogas, partially upgraded biogas, or RNG as a feedstock.

In one embodiment the central processing facility is a chemical or fuel production facility that produces the chemical or fuel based on a one-step conversion process (e.g., partial oxidation of methane to methanol).

In one embodiment the central processing facility is a chemical or fuel production facility that produces the chemical or fuel based on a multiple-step conversion process (e.g., based on a syngas intermediate). Syngas, which is a mixture including CO and $H_2$, may be formed by subjecting methane to methane reforming (e.g., steam methane reforming (SMR), autothermal reforming (ATR), or partial oxidation). In one embodiment, the chemical or fuel production facility produces syngas from biogas-derived methane (e.g., forms biogas-derived syngas).

In one embodiment the central processing facility produces $H_2$. In one embodiment, $H_2$ is produced by subjecting biogas-derived methane to a SMR reaction to produce syngas, which is subject to a water gas shift reaction (WGS) to increase the concentration of the $H_2$, followed by a pressure swing adsorption (PSA) stage to purify the $H_2$. The purified $H_2$ may be considered renewable $H_2$, and can be used directly as a fuel, or can be used to produce gasoline or diesel having renewable content (e.g., see U.S. Pat. No. 8,753,854).

In one embodiment, the central processing facility produces methanol. Methanol may be formed in a methane-to-methanol process. For example, in one embodiment, the central processing facility produces methanol from biogas-derived methane using Imperial Chemical Industries (ICI) low pressure methanol (LPM) process, Katalco low pressure methanol process, Lurgi low pressure methanol process, Haldor-Topsoe process, or liquid process such as the liquid-phase methanol synthesis process (LPMeOH). Suitable catalysis may include copper, zinc, oxide, alumina, chromium oxide, or combinations thereof. Methanol may be used as a fuel (e.g., marine fuel), may be blended with gasoline, may be used in a methanol-to-olefins process, may be used to produce DME, may be used to produce methyl tertiary butyl ether (MTBE), may be used to produce biodiesel, or may be used in a methanol-to-gasoline (MTG) process. In one embodiment, the central processing facility produces DME, MTBE, biodiesel, or gasoline from biogas-derived methanol.

In one embodiment, the central processing facility produces ethanol. Ethanol may be formed by gas fermentation of syngas with anaerobic microorganisms. Ethanol may be used as a fuel or may be blended with gasoline. In one embodiment, the central processing facility produces ethanol from biogas-derived syngas.

In one embodiment, the central processing facility produces gasoline. Gasoline may be produced by converting syngas to methanol, which is transformed into gasoline (e.g., a methanol-to-gasoline (MTG) process). In one embodiment, the central processing facility produces gasoline from biogas-derived syngas.

In one embodiment, the central processing facility produces diesel. Diesel may be produced using a gas-to-liquid (GTL) refinery process where methane is converted to longer-chain hydrocarbons via a syngas intermediate. For example, diesel may be produced using a Fisher-Tropsch type process. In one embodiment, the central processing facility produces diesel from biogas-derived syngas.

In one embodiment, the central processing facility produces DME. DME may be produced by catalytic dehydration of methanol. DME may be used as a fuel for diesel engines (e.g., a clean diesel alternative). In one embodiment, the central processing facility produces DME from biogas-derived methanol.

In each of the above described chemical or fuel central processing facilities that use methane as a feedstock, the feedstock may be entirely derived from biogas (e.g., producing only renewable fuel) or may be a combination of fossil based methane and biogas-derived methane. For example, in one embodiment, the central processing facility was designed to produce the chemical and/or fuel using a fossil natural gas feedstock, but has been provided with a receiving station and biogas upgrading system in order to also use a biogas-derived methane as a feedstock.

Advantageously, using biogas or biogas-derived methane in the production of fuels can provide a fuel that is a renewable fuel and/or has renewable content. In embodiments where the feedstock for the fuel production is a combination of fossil methane and biogas-derived methane, the portion of the fuel that is considered to be renewable and/or to have the renewable content, may be calculated (e.g., energy balance, or mass balance calculation). For example, in one embodiment, the biogas-derived methane is fed into a pipeline containing fossil methane and feeding a process that produces a renewable fuel and a fossil fuel (e.g., renewable gasoline and gasoline). The environmental attributes of the biogas-derived methane are transferred to the renewable fuel (e.g., using the displacement principle often used in natural gas lines where the commodity is fungible).

In one embodiment, a fuel credit or renewable energy credit associated with the biogas and/or fuel is generated or caused to be generated. The term "cause" or "causing", as used herein, refers to arranging or bringing about a specific result (e.g., a withdrawal of a gas from a distribution system), either directly or indirectly, or playing a role in a series of activities through commercial arrangements such as a written agreement, verbal agreement, or contract.

The term "credit", "renewable fuel credit", or "fuel credit", as used herein, refers to any rights, credits, revenues, offsets, greenhouse gas rights, or similar rights related to carbon credits, rights to any greenhouse gas emission reductions, carbon-related credits or equivalent arising from emission reduction trading or any quantifiable benefits (including recognition, award or allocation of credits, allowances, permits or other tangible rights), whether created from or through a governmental authority, a private contract, or otherwise. The renewable fuel credit may be a certificate, record, serial number or guarantee, in any form, including electronic, which evidences production of a quantity of fuel meeting certain life cycle GHG emission reductions relative to a baseline (e.g., a gasoline baseline) set by a government authority.

The generation of fuel credits or renewable energy credit associated with the biogas and/or fuel may be related to the environmental attributes thereof and/or the corresponding life cycle GHG emission emissions. To determine life cycle GHG emissions associated with a fuel, analyses are conducted to calculate the GHG emissions related to the production and use of the fuel throughout its life cycle. Life cycle GHG emissions include the aggregate quantity of GHG emissions related to the full life cycle of the fuel, including all stages of fuel and feedstock production and distribution, from feedstock generation or extraction, through the distribution and delivery, and use of the finished fuel to the ultimate consumer. GHG emissions typically account for total net GHG emissions, both direct and indirect, associated with feedstock production and distribution, the fuel production, and distribution and use.

In one embodiment, the fuel produced is a transportation fuel, and a fuel credit is generated or is caused to be generated. Fuel credits, such as Renewable Identification Numbers (RINs) under the US Environmental Protection Agency (EPA) Renewable Fuel Standard, or carbon credits under state supported low carbon fuel standards, can be lucrative.

In one embodiment, the transportation fuel has life cycle GHG emissions that are at least 20% less than the life cycle GHG emissions of a gasoline baseline using EPA methodology, preferably at least 50% or 60% less.

Description of Some Embodiments

Figure 6:
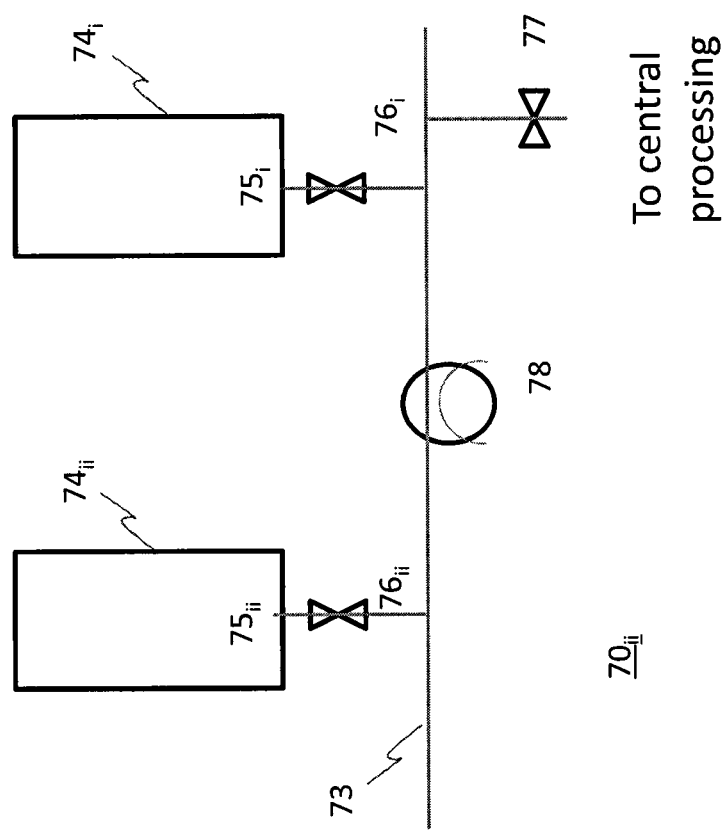
FIG. 6 is a schematic diagram of a receiving station in accordance with one embodiment of the invention; and, FIG. 7 is a schematic diagram of a receiving station in accordance with one embodiment of the invention.

Referring to FIG. 6, there is shown an embodiment of a receiving station $70_{ii}$, wherein a first mobile tank $74_i$ is stationed at a first receiving terminal $75_i$ and a second mobile tank $74_{ii}$ is stationed at a second receiving terminal $75_{ii}$. Each of the first $75_i$ and second $75_{ii}$ receiving terminals are coupled to a manifold 73. When valve $76_i$ or $76_{ii}$ is open, the first $74_i$ or second $74_{ii}$ mobile tank, respectively, may be in fluid communication with the pressure let down system 77. When both valves $76_i$ and $76_{ii}$ are open, the first $74_i$ and second $74_{ii}$ mobile tank also may be in fluid communication with each other and gas flowing therebetween may be heated with the heat exchanger 78.

In operation, according to one embodiment, valve $76_{ii}$ remains closed while valve $76_i$ is open so that the gas in the first mobile tank $74_i$ is fed to the pressure let down system 77. As the pressure drops and the contents of the first mobile tank $74_i$ are removed, the temperature of the expanded gas (e.g., provided to central processing) and the temperature of the gas in the first tank $74_i$ drops. Before the temperature decreases to the point where a phase change is likely (e.g., before it reaches the dew point), the pressure let down system 77 is turned to an off state. The valve $76_{ii}$ to the second tank $74_{ii}$ is opened so that gas therein can flow to the first tank $74_i$, which is at a lower pressure. As gas flows from the second tank $74_{ii}$ to the first tank $74_i$, it is heated by heat exchanger 78. Once the relatively warm gas from the second tank $74_{ii}$ fills the first tank $74_i$ to a certain level, the second valve $76_{ii}$ is closed, and the pressure let down system 77 is turned to an on state, such that the combined gas in the first tank $74_i$ is depressurized to a certain value. Optionally, this process is repeated until the pressure in the first tank $74_i$ reaches the final depressurization pressure. Once the contents of the first tank $74_i$ have been depressurized and fed to the central processing facility, the contents of the second tank $77_{ii}$ may be depressurized using another mobile tank (not shown) as a supply tank.

Advantageously, this process may reduce the risk of a phase change in the first tank. As an example, consider the case where each mobile tank $74_i$, $74_{ii}$ starts the process with about 11.78 tonnes of a mixture containing about 50% $CH_4$, 38% $CO_2$, 10% $N_2$, and 2% $O_2$, on a molar basis, which is pressurized to about 3000 psig at about 60° C.

Using thermodynamic charts calculated with AspenTech software and the Peng-Robinson equation of state, and assuming an adiabatic, isentropic decompression, it has been found that removing about 5.78 tonnes from the first tank can reduce the pressure to 920 psig (which corresponds to a temperature of −23° C.), without reaching the dew point (e.g., calculated to be −28° C.). Unfortunately, although the dew point is avoided, this depressurization does not remove even half of the biogas from the mobile tank (e.g., 6 tonnes remain).

In one embodiment, additional biogas may be removed from the tank without nearing the dew point as follows. The temperature of the gas in the first tank is increased by adding in about 2.38 tonnes of the gas from the second tank, after heating this gas to 100° C. Since the second tank was at 3000 psig, and the first tank at 920 psig, the transfer of gas may be pressure driven. By assuming constant enthalpy in the system comprising the two tanks, this transfer between tanks increases the pressure in the first tank to 1928 psig and the temperature to 42° C.

In a second stage, about 3.7 tonnes from the first tank (e.g., of the mixed gas) is removed using the pressure let down system. If we assume adiabatic, isentropic decompression, this reduces the pressure of the first tank to 765 psig (which corresponds to a temperature of −25° C.). Again the dew point, which is calculated to be about −30° C. for this pressure, is avoided. Advantageously, this two stage depressurization allows more mass to be removed from the first tank while reducing the risk of a phase change. For example, at the end of the first stage depressurization the mass of gas in the first tank is about 51% of the initial mass, whereas at the end of the second stage depressurization the mass of gas in the first tank is about 40% of the initial mass.

As summarized in Table 1, this depressurization/repressurization may be continued for additional stages. The values in brackets refer to the dew point at the corresponding pressure. Taking into account heat transfer between the tank and the environment, the number of stages required to reach a final pressure of 110 psig may be lower than shown.

TABLE 1

Calculated multi-stage pressure reduction with warming gas at 100° C.

| | | Tank 1 | | | Tank 2 | | |
|---|---|---|---|---|---|---|---|
| Stage | | T/° C. | P/psig | Weight/t | T/° C. | P/psig | Weight/t |
| Initial | | 60 | 3000 | 11.78 | 60 | 3000 | 11.78 |
| 1 | Depressure | −23 (−28) | 920 | 6.0 | — | — | — |
| | Repressure | 42 | 1928 | 8.4 | 29 | 1950 | 9.4 |
| 2 | Depressure | −25 (−30) | 765 | 4.7 | — | — | — |
| | Repressure | 35 | 1395 | 6.1 | 7 | 1440 | 8.0 |
| 3 | Depressure | −30 (−35) | 590 | 3.2 | — | — | — |
| | Repressure | 34 | 1120 | 4.3 | −10 | 1125 | 6.9 |
| 4 | Depressure | −30 (−38) | 420 | 2.0 | — | — | — |
| | Repressure | 77 | 900 | 3.0 | −23 | 920 | 6.0 |
| Final | | −60 (−72) | 110 | 0.5 | — | — | — |

Figure 7:
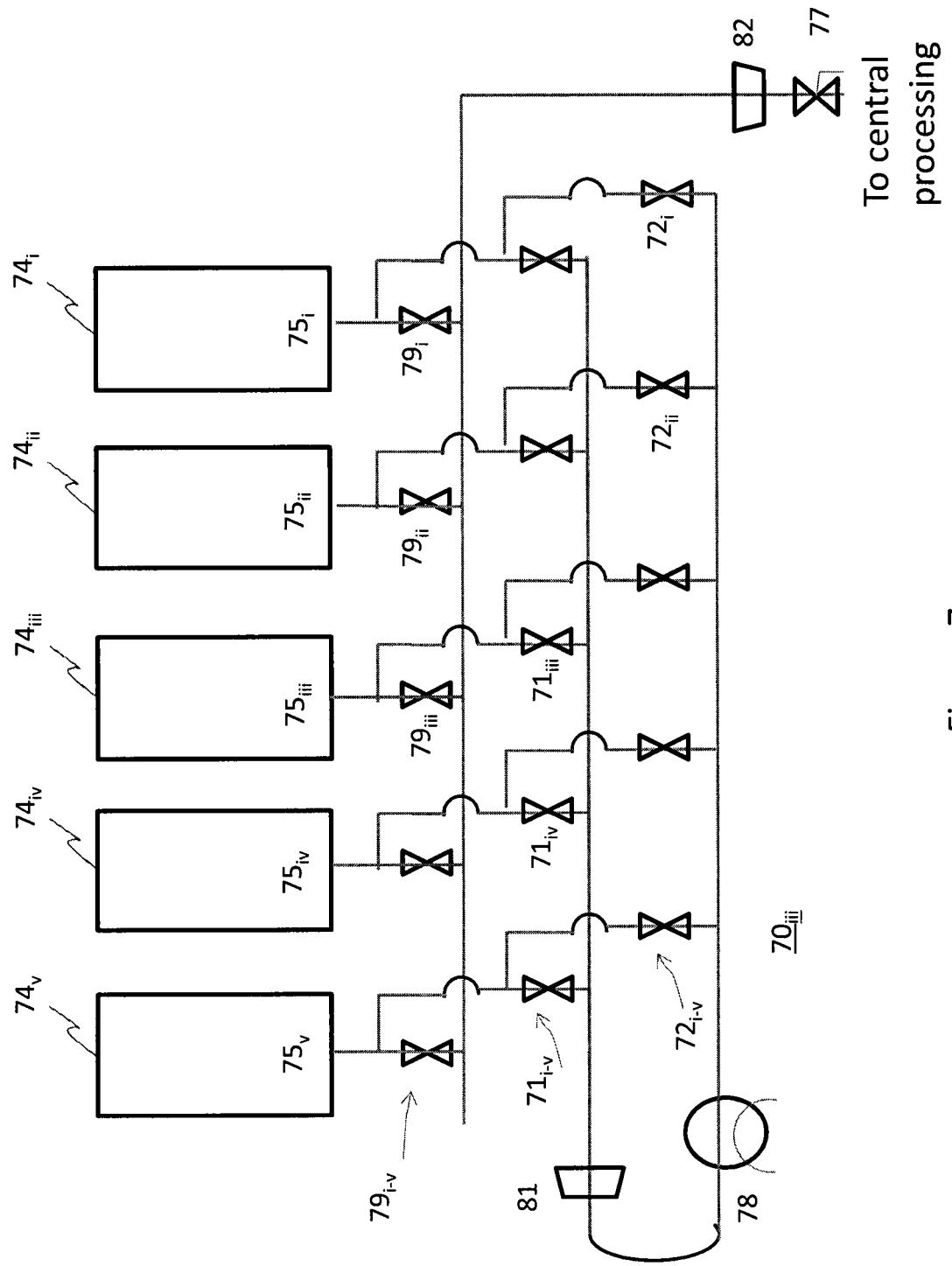

Referring to FIG. 7, there is shown another embodiment of a receiving station. In this embodiment, the receiving station $70_{iii}$ includes a plurality of receiving terminals $75_{i-v}$ each of which is coupled to a manifold having a plurality of valves $71_{i-v}$, $72_{i-v}$, and $79_{i-v}$. These valves can provide isolation and/or directional flow control. More specifically, these valves can be used, in combination, to select which mobile tanks are being decanted (via the pressure let down system), which mobile tanks are being repressurized with warming gas, which mobile tanks are being used to supply a warming gas, and which mobile tanks are in queue. For example, each valve in the $79_{i-v}$ series (horizontal) determines which mobile tank is being decanted. Advantageously, more than one tank can be decanted at a time and the selection is not limited to a specific order. Each valve in the series determines which mobile tank provides gas to be warmed with heat exchanger 78 (i.e., which mobile tank is a supply tank). Advantageously, gas from more than one tank can be heated at one time and the selection is not limited to a specific order. Each valve in the $72_{i-v}$ series determines which mobile tank receives the warming gas (e.g., is a receiving tank). Advantageously, more than one tank can be repressurized at a time and the selection is not limited to a specific order. Accordingly, the tank selection/function may be based on pressure readings, temperature readings, and or gas compositions. Optionally, the system includes one or more compressors 81, 82 (e.g., scavenger compressors) and/or one or more venturi pumps (not shown).

Advantageously, this configuration allows the simultaneous decanting and repressurization of different mobile tanks (e.g., one tank can be decanted while another tank is being warmed/pressurized). According, such a configuration may allow a continuous or near continuous operation of the pressure let down system (e.g., it is not cyclically switched between an on and off-state during the depressurization).

For example, consider the following example where a plurality of mobile tanks $74_{i-v}$ is received at the receiving station $70_{iii}$, where each mobile tank is at 3000 psig (e.g., has an initial pressure of about 3000 psig) and 60° C., and is to be depressurized to 110 psig (e.g., has a final pressure of about 110 psig), according to Table 1.

The first mobile tank $74_i$ is depressurized from 3000 psig to 920 psig by opening valve $79_i$ and providing fluid communication with the pressure let-down system 77. Once the first mobile tank $74_i$ is depressurized to 920 psig, the second mobile tank $74_{ii}$ is depressurized from 3000 psig to 920 psig (i.e., after closing valve $79_i$ and opening valve $79_{ii}$).

As the second mobile tank $74_{ii}$ is depressurized from 3000 psig to 920 psig, the first mobile tank $74_i$ is pressurized from 920 psig to 1928 psig using warming gas sourced from the third mobile tank $74_{iii}$, which is at 3000 psig (e.g., valves $71_{iii}$ and $72_i$ are open, while valve $79_i$ is closed and valve $79_{ii}$ is open).

Once the second mobile tank $74_{ii}$ is depressurized from 3000 psig to 920 psig, the first mobile tank $74_i$, which now includes warming gas, is depressurized from 1928 psig to 765 psig (i.e., after closing valves $79_{ii}$, $71_{iii}$, and $72_i$, and opening valve $79_i$.

As the first mobile tank $74_i$ is depressurized from 1928 psig to 765 psig, the second mobile tank $74_{ii}$ is pressurized from 920 psig to 1928 psig using warming gas sourced from the fourth mobile tank $74_{iv}$, which is at 3000 psig (e.g., valves $71_{iv}$ and $72_{ii}$ are open, while valve $79_{ii}$ is closed and valve $79_i$ is open). Once the first mobile tank $74_i$ is depressurized from 1928 psig to 765 psig, the second mobile tank $74_{ii}$, which now includes warming gas, is depressurized from 1928 to 765 psig (i.e., after closing valves $79_i$, $71_{iv}$, and $72_{ii}$, and opening valve $79_{ii}$).

As the second mobile tank $74_{ii}$ is depressurized from 1928 psig to 765 psig, the first mobile tank $74_i$ is pressurized from 765 psig to 1395 psig using warming gas sourced from the third mobile tank $74_{iii}$, which is at 1950 psig (e.g., valves $71_{iii}$ and $72_i$ are open, while valve $79_i$ is closed and valve $79_{ii}$ is open).

Once the second mobile tank $74_{ii}$ is depressurized from 1928 psig to 765 psig, the first mobile tank $74_i$ is depressurized from 1395 psig to 590 psig (i.e., after closing valves $79_{ii}$, $71_{iii}$, and $72_i$, and opening valve $79_i$).

As the first mobile tank $74_i$ is depressurized from 1395 psig to 590 psig, the second mobile tank $74_{ii}$ is pressurized from 765 psig to 1395 psig to using warming gas sourced from the fourth mobile tank $74_{iv}$, which is at 1950 psig (e.g., valves $71_{iv}$ and $72_{ii}$ are open, while valve $79_{ii}$ is closed and valve $79_i$ is open).

Once the first mobile tank $74_i$ is depressurized from 1395 psig to 590 psig, the second mobile tank $74_i$ is depressurized from 1395 psig to 590 psig (i.e., after closing valves $79_i$, $71_{iv}$, and $72_{ii}$, and opening valve $79_{ii}$).

As the second mobile tank $74_{ii}$ is depressurized from 1395 psig to 590 psig, the first mobile tank $74_i$ is pressurized from 590 psig to 1120 psig using warming gas sourced from the third mobile tank $74_{iii}$, which is at 1440 psig (e.g., valves $71_{iii}$ and $72_i$ are open, while valve $79_i$ is closed and valve $79_{ii}$ is open).

Once the second mobile tank $74_{ii}$ is depressurized from 1395 psig to 590 psig, the first mobile tank $74_i$ is depressurized from 1120 psig to 420 psig (i.e., after closing valves $79_{ii}$, $71_{iii}$, and $72_i$, and opening valve $79_i$).

As the first mobile tank $74_i$ is depressurized from 1120 psig to 420 psig, the second mobile tank $74_i$ is pressurized from 590 psig to 1120 psig to using warming gas sourced from the fourth mobile tank $74_{iv}$, which is at 1440 psig (e.g., valves $71_{iv}$ and $72_{ii}$ are open, while valve $79_{ii}$ is closed and valve $79_i$ is open).

Once the first mobile tank $74_i$ is depressurized from 1120 psig to 420 psig, the second mobile tank $74_i$ is depressurized from 1120 psig to 420 psig (i.e., after closing valves $79_i$, $71_{iv}$, and $72_{ii}$, and opening valve $79_{ii}$).

As the second mobile tank $74_{ii}$ is depressurized from 1120 psig to 420 psig, the first mobile tank $74_i$ is repressurized from 420 psig to 900 psig using warming gas sourced from the third mobile tank $74_{iii}$, which is at 1125 psig (e.g., valves $71_{iii}$ and $72_i$ are open, while valve $79_i$ is closed and valve $79_{ii}$ is open).

Once the second mobile tank $74_{ii}$ is depressurized from 1120 psig to 420 psig, the first mobile tank $74_{ii}$ is depressurized from 900 psig to 110 psig (i.e., after closing valves $79_{ii}$, $71_{iii}$, and $72_i$, and opening valve $79_i$).

As the first mobile tank $74_i$ is depressurized from 900 psig to 110 psig, the second mobile tank $74_{ii}$ is pressurized from 420 psig to 900 psig to using warming gas sourced from the fourth mobile tank $74_{iv}$, which is at 1125 psig (e.g., valves $71_{iv}$ and $72_{ii}$ are open, while valve $79_{ii}$ is closed and valve $79_i$ is open).

Once the first mobile tank $74_i$ is depressurized from 900 psig to 110 psig, the second mobile tank $74_i$ is depressurized from 900 psig to 110 psig (i.e., after closing valves $79_i$, $71_{iv}$, and $72_{ii}$, and opening valve $79_{ii}$).

The third mobile tank $74_{iii}$, which is now at 920 psig, is pressurized from 920 psig to 1928 psig using warming gas sourced from the fifth mobile tank $74_v$, which is at 3000 psig.

The first $74_i$ and second $74_{iii}$, mobile tanks are then disconnected and transported for refilling (e.g., after closing valve $79_{ii}$), and mobile tanks at about 3000 psig may be received.

The examples discussed with reference to Table 1 were calculated for a mixture containing about 50% $CH_4$, 38% $CO_2$, 10% $N_2$, and 2% $O_2$, pressurized to 3000 psig, and having an initial temperature of 60° C., assuming an adiabatic isentropic decompression. In practice, the gas in the mobile tank(s) may gain or lose heat with time, depending on whether the tank is colder or hotter than the external temperature. Accordingly, the target depressurized pressure for each stage and/or the number of stages may be dependent on the biogas composition, initial pressures, initial temperature, and/or heat transfer capabilities of the mobile tank (e.g., steel tanks may allow greater heat dissipation than composite tanks). For example, in practice, it may be possible to decant a mixture containing about 35% $CO_2$ and about 50% $CH_4$, pressurized to 3000 psig, and having an initial temperature of 60° C., to 200 psig without risking a phase change with 1 or 2 cycles, depending on the external temperature, the heat transfer capabilities of the mobile tank, and/or on the heating provided (e.g., temperature of warming gas and/or presence of tank heaters). Introducing a warming gas during the depressurization may be particularly advantageous in winter conditions where the ambient temperature may be relatively low (e.g., 0° C.).

Of course, the above embodiments have been provided as examples only. It will be appreciated by those of ordinary skill in the art that various modifications, alternate configurations, and/or equivalents will be employed without departing from the spirit and scope of the invention. For example, the receiving station configurations and pressure examples are provided for illustrative purposes, other configurations and/or pressures are possible and within the scope of the invention. Furthermore, although the various embodiments are described with reference to biogas, the methods and systems described herein can be used for any $CO_2/CH_4$ mixture. Although the various embodiments may be described with regard to decanting, transferring, heating, adding, etc. a "gas", as used herein, this term includes supercritical mixtures. Accordingly, the scope of the invention is therefore intended to be limited solely by the scope of the appended claims.

What is claimed is:

1. A method of processing biogas comprising:
   providing a mobile tank containing biogas at an initial pressure, said initial pressure greater than 1000 psig, said biogas being raw biogas or partially purified biogas and comprising carbon dioxide and methane;
   connecting the mobile tank containing biogas to a pressure let down system; and
   depressurizing the mobile tank from the initial pressure to a final pressure while avoiding a phase change to liquid and/or solid within the mobile tank, said depressurizing comprising:
   a) removing gas from the mobile tank using the pressure let down system; and
   b) introducing a warming gas into the mobile tank,
   wherein depressurizing the mobile tank from the initial pressure to the final pressure comprises removing at least half of the biogas by mass initially present in the mobile tank before introducing the warming gas into the mobile tank.

2. The method according to claim 1, comprising monitoring a pressure of the mobile tank, wherein step b) is conducted in dependence upon the monitored pressure.

3. The method according to claim 1, comprising monitoring a temperature of the mobile tank, wherein step b) is conducted in dependence upon the monitored temperature.

4. The method according to claim 1, wherein the warming gas introduced into the mobile tank is least 20° C. warmer than the gas present in the mobile tank.

5. The method according to claim 1, wherein the warming gas comprises raw biogas, partially purified biogas, renewable natural gas, or any combination thereof.

6. The method according to claim 1, comprising heating the warming gas prior to introducing it into the mobile tank.

7. The method according to claim 6, wherein heating the warming gas comprises heating the warming gas to a temperature between 40° C. and 120° C.

8. The method according to claim 6, wherein heating the warming gas comprises heating the warming gas to a temperature between 80° C. and 105° C.

9. The method according to claim 1, wherein the biogas received in the mobile tank has a carbon dioxide content of at least 10%.

10. The method according to claim 1, wherein said initial pressure is greater than 2000 psig, and wherein the warming gas is introduced into the mobile tank when the pressure in the mobile tank is reduced to an intermediate pressure, said intermediate pressure between 1500 psig and 500 psig.

11. The method according to claim 1, wherein depressurizing the mobile tank from the initial pressure to the final pressure comprises simultaneously performing steps a) and b) after the removing of at least half of the biogas by mass initially present in the mobile tank.

12. The method according to claim 1, wherein depressurizing the mobile tank from the initial pressure to a final pressure comprises iteratively alternating between steps a) and b).

13. The method according to claim 12, wherein for each iteration, the amount of gas removed in a) is at least 10% w/w of the gas present in the mobile tank.

14. The method according to claim 12, wherein for each iteration, the amount of warming gas introduced in b) is at least 10% w/w of the gas present in the mobile tank.

15. The method according to claim 1, comprising:
   providing a second other mobile tank containing biogas at pressure greater than 1000 psig;
   providing a fluid connection between the second mobile tank and the mobile tank; and
   removing biogas from the second mobile tank and using the biogas removed from the second mobile tank to provide the warming gas to the mobile tank.

16. The method according to claim 15, comprising warming the gas removed from the second mobile tank with a heat exchanger, and wherein introducing a warming gas into the mobile tank comprises introducing the warmed gas removed from the second mobile tank.

17. The method according to claim 1, wherein providing the mobile tank containing biogas at the initial pressure comprises:
   collecting raw biogas from a biogas source;
   compressing biogas from the biogas source and filling the mobile tank to the initial pressure;
   transporting the mobile tank to a central processing facility, said central processing facility comprising the pressure let down system.

18. The method according to claim 1, comprising maintaining a temperature within the mobile tank within a predetermined range as it is depressurized by adjusting at least one of a temperature and amount of the warming gas introduced into the mobile tank.

19. The method according to claim 1, comprising processing the biogas removed from the mobile tank to produce renewable natural gas, hydrogen, methanol, ethanol, gasoline, diesel, dimethyl ether, or any combination thereof.

20. A method of processing biogas comprising:
providing a mobile tank containing biogas at an initial pressure, said initial pressure greater than 1000 psig, said biogas being raw biogas or partially purified biogas and comprising carbon dioxide and methane;
connecting the mobile tank containing biogas to a pressure let down system;
feeding biogas in the mobile tank to the pressure let down system;
reducing the pressure in the mobile tank from the initial pressure to a final pressure using the pressure let down system while avoiding a phase change to liquid and/or solid within the mobile tank, the phase change avoided by maintaining a temperature within the mobile tank within a predetermined range as the pressure is reduced to the final pressure by introducing a warming gas into the mobile tank, wherein at least half of the biogas by mass initially present in the mobile tank is removed before introducing the warming gas; and,
feeding a gas stream comprising the biogas removed from the mobile tank to a biogas upgrading system, a fuel production system, or a combination thereof.

21. A method of producing a fuel from biogas comprising:
filling a mobile tank with biogas to a first pressure, said biogas comprising raw biogas or partially purified biogas from a first source;
transporting the mobile tank containing the biogas;
unloading the transported biogas from the mobile tank; and
producing upgraded biogas, a fuel, or a combination thereof from the unloaded biogas,
wherein unloading the transported biogas from the mobile tank comprises avoiding a phase change to liquid and/or solid within the mobile tank and comprises removing a mixture comprising the biogas from the first source and biogas from a second other source, where the biogas from the second other source is raw biogas or partially purified biogas introduced into the mobile tank during said unloading, and wherein at least half of the biogas by mass initially present in the mobile tank is removed before introducing the biogas from the second other source.

* * * * *